(12) United States Patent
Han et al.

(10) Patent No.: US 12,314,533 B2
(45) Date of Patent: May 27, 2025

(54) ELECTRONIC DEVICE FOR RECOMMENDING INFORMATION ACCORDING TO SITUATION AND METHOD FOR CONTROLLING THE SAME

(71) Applicant: SAMSUNG ELECTRONICS CO., LTD., Suwon-si (KR)

(72) Inventors: Jonghyun Han, Suwon-si (KR); Sangheon Kim, Suwon-si (KR); Seokwon Kim, Suwon-si (KR); Sumi Kim, Suwon-si (KR); Hyunmin Kim, Suwon-si (KR); Seungyong Lee, Suwon-si (KR); Kicheol Jeon, Suwon-si (KR); Seungpyo Hong, Suwon-si (KR); Younghak Oh, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 56 days.

(21) Appl. No.: 18/097,025

(22) Filed: Jan. 13, 2023

(65) Prior Publication Data
US 2023/0297212 A1 Sep. 21, 2023

Related U.S. Application Data

(63) Continuation of application No. PCT/KR2023/000049, filed on Jan. 2, 2023.

(30) Foreign Application Priority Data

Jan. 14, 2022 (KR) .................. 10-2022-0006212
Mar. 11, 2022 (KR) .................. 10-2022-0030674

(51) Int. Cl.
*G06Q 30/0601* (2023.01)
*G06F 3/0482* (2013.01)

(52) U.S. Cl.
CPC ....... *G06F 3/0482* (2013.01); *G06Q 30/0631* (2013.01); *G06Q 30/0641* (2013.01)

(58) Field of Classification Search
CPC .................................................. G06F 9/4881
See application file for complete search history.

(56) References Cited

U.S. PATENT DOCUMENTS 10,410,294 B1    9/2019  Chatman et al.
11,200,282 B1 *  12/2021 Devenny .............. G06Q 10/109
(Continued)

FOREIGN PATENT DOCUMENTS

JP    2002269057 A    9/2002
KR   20110115910 A   10/2011
(Continued)

OTHER PUBLICATIONS

International Search Report and Written Opinion for International Application No. PCT/KR2023/000049; International Filing Date Jan. 2, 2023; Date of Mailing Apr. 10, 2023; 9 Pages.

*Primary Examiner* — Di Xiao
(74) *Attorney, Agent, or Firm* — CANTOR COLBURN LLP

(57) ABSTRACT

An electronic device is disclosed. An electronic device according to the disclosure may include a display, a memory, and at least one processor, wherein the at least one processor is configured to execute instructions to, based on a content displayed on the display satisfying a configured condition, acquire information included in the content, arrange, based on a first priority, plurality of items acquired based on the information included in the content and store in the memory, rearrange the plurality of items, based on a second priority based on a current time point satisfying the configured condition, and control the display to display the plurality of rearranged items.

18 Claims, 24 Drawing Sheets

(56) References Cited

U.S. PATENT DOCUMENTS

| | | | |
|---|---|---|---|
| 2012/0089642 A1* | 4/2012 | Milward | G06F 16/313 |
| | | | 707/E17.022 |
| 2014/0344745 A1 | 11/2014 | Possing et al. | |
| 2015/0135088 A1 | 5/2015 | Lim et al. | |
| 2017/0065117 A1* | 3/2017 | Reese | G06Q 10/06 |
| 2017/0235910 A1* | 8/2017 | Cantillon | G16H 10/60 |
| | | | 705/2 |
| 2019/0266573 A1 | 8/2019 | Radhakrishnan et al. | |
| 2021/0049631 A1* | 2/2021 | Thirunavukkarasu | |
| | | | G06Q 30/0211 |
| 2021/0202057 A1* | 7/2021 | Utech | G16H 20/10 |
| 2021/0209394 A1 | 7/2021 | Hwang et al. | |
| 2021/0304086 A1 | 9/2021 | Mehta et al. | |
| 2022/0060792 A1* | 2/2022 | Kim | H04N 21/44008 |
| 2024/0005150 A1* | 1/2024 | Dugger | G06N 3/08 |

FOREIGN PATENT DOCUMENTS

| | | |
|---|---|---|
| KR | 20130012239 A | 2/2013 |
| KR | 20150012878 A | 2/2015 |
| KR | 20160009665 A | 1/2016 |
| KR | 20160092583 A | 8/2016 |
| KR | 20180124550 A | 11/2018 |
| KR | 20180131511 A | 12/2018 |
| KR | 20200049464 A | 5/2020 |
| KR | 20200075624 A | 6/2020 |

\* cited by examiner

ELECTRONIC DEVICE FOR RECOMMENDING INFORMATION ACCORDING TO SITUATION AND METHOD FOR CONTROLLING THE SAME

CROSS-REFERENCE TO RELATED APPLICATIONS

This application is a continuation of International Application No. PCT/KR2023/000049, filed Jan. 2, 2023, designating the United States, in the Korean Intellectual Property Receiving Office, and claiming priority to KR Patent Application No. 10-2022-0030674, filed Mar. 11, 2022, and to KR Patent Application No. 10-2022-0006212, filed Jan. 14, 2022, the disclosures of which are all hereby incorporated by reference herein in their entireties.

BACKGROUND

Field

Embodiments of the disclosure relate to an electronic device for recommending information according to a situation, and a method for controlling the same.

Description of Related Art

Various services and additional functions provided through electronic devices, for example, a portable electronic device such as a smartphone, are gradually increasing. In order to increase the utility value of such electronic devices and satisfy the needs of various users, communication service providers or electronic device manufacturers offer various functions and develop electronic devices competitively to differentiate them from other companies. Accordingly, various functions provided through electronic devices are becoming more advanced.

Electronic devices provide various graphic user interfaces (GUIs) for interaction with users through a display.

In order for a user to acquire information, an electronic device recommends related information, based on information input by the user, so as to improve a situation that the user needs to directly search for and record desired information at a desired time.

In this way, when related information is recommended based on the information pre-input by the user, information that the user is not actually interested in may be recommended in some cases, and information may be recommended at a time point irrelevant to a time point at which the user needs the recommendation information.

SUMMARY

Information related to information that is not input by the user may not be provided to the user even though the information is desired by the user.

Various embodiments of the disclosure may provide an electronic device for providing information desired by a user in a timely manner according to a situation, and a method for controlling the same.

According to an embodiment, an electronic device may include a display, a memory, and at least one processor, wherein the at least one processor is configured to execute instructions to, if a content displayed on the display satisfies a configured condition, acquire information included in the content, arrange, based on a first priority, multiple items acquired based on the information included in the content so as to store the same in the memory, rearrange the multiple items, based on a second priority if a current time point satisfies the configured condition, and control the display to display the rearranged multiple items.

According to an embodiment, a control method of an electronic device may include, if a content displayed on a display of the electronic device satisfies a configured condition, acquiring information included in the content, arranging, based on a first priority, multiple items acquired based on the information included in the content so as to store the same in a memory of the electronic device, rearranging the multiple items, based on a second priority if a current time point satisfies the configured condition, and controlling the display to display the rearranged multiple items.

An electronic device, according to an embodiment of the disclosure, may provide a user with desired information in a timely manner by changing a priority of information in connection with the user's schedule.

The electronic device, according to an embodiment of the disclosure, may acquire information based on a user's interest and recommends information based thereon so as to provide more appropriate information to a user.

The electronic device, according to an embodiment of the disclosure, may provide updated information to a user in real time by rearranging the updated information with the highest priority.

DETAILED DESCRIPTION

Figure 1:
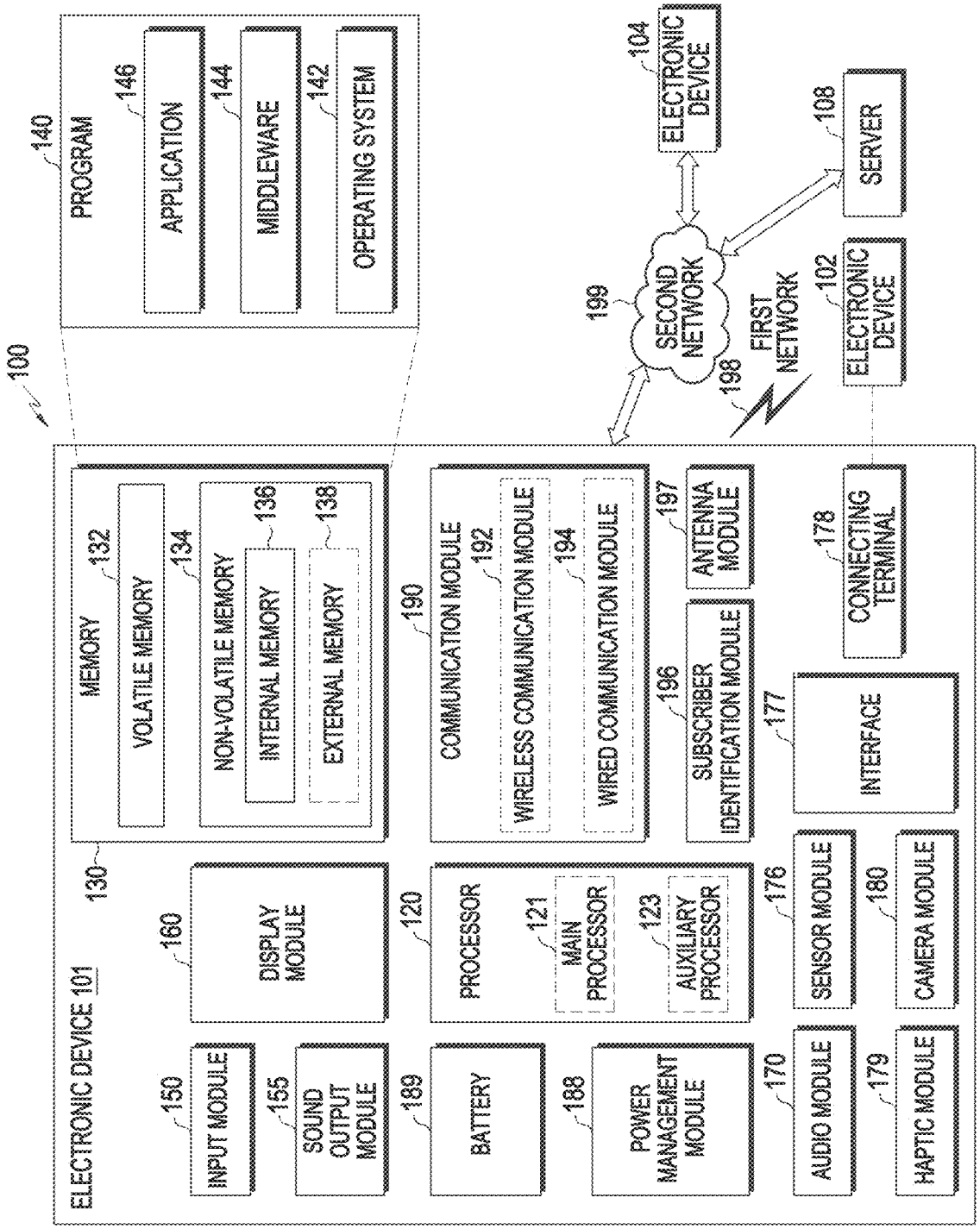
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
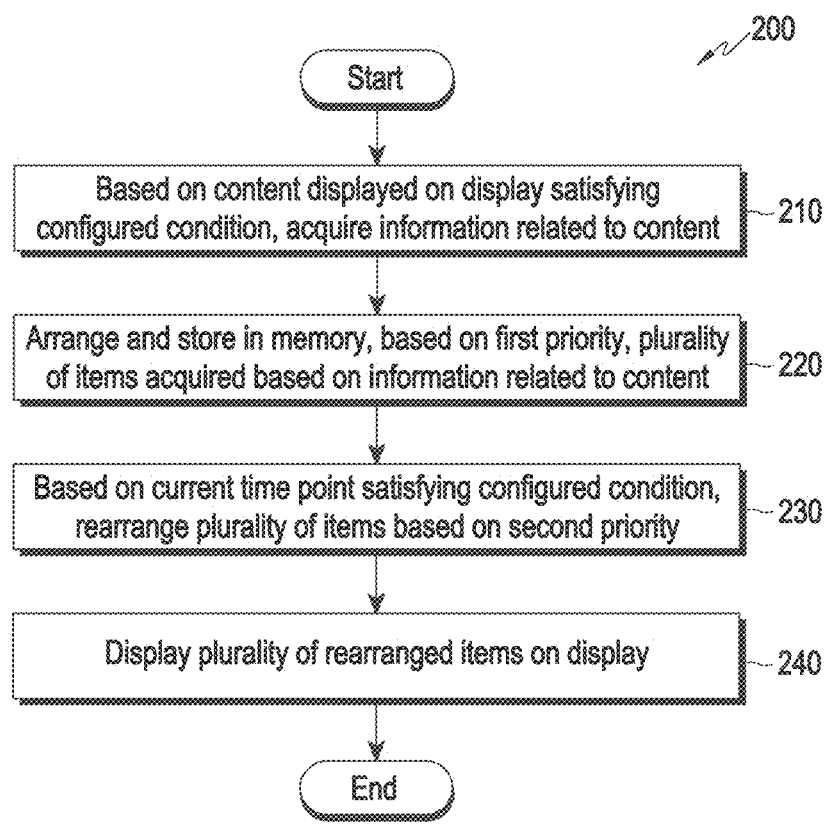
FIG. 2 is a flowchart for illustrating an operation of an electronic device for rearranging multiple items, based on a current time point according to an embodiment.

FIG. 2 is a flowchart 200 for illustrating an operation of an electronic device for rearranging multiple items, based on a current time point according to an embodiment. FIG. 2 will be described in connection with FIG. 4A to FIG. 4C.

Figure 4A:
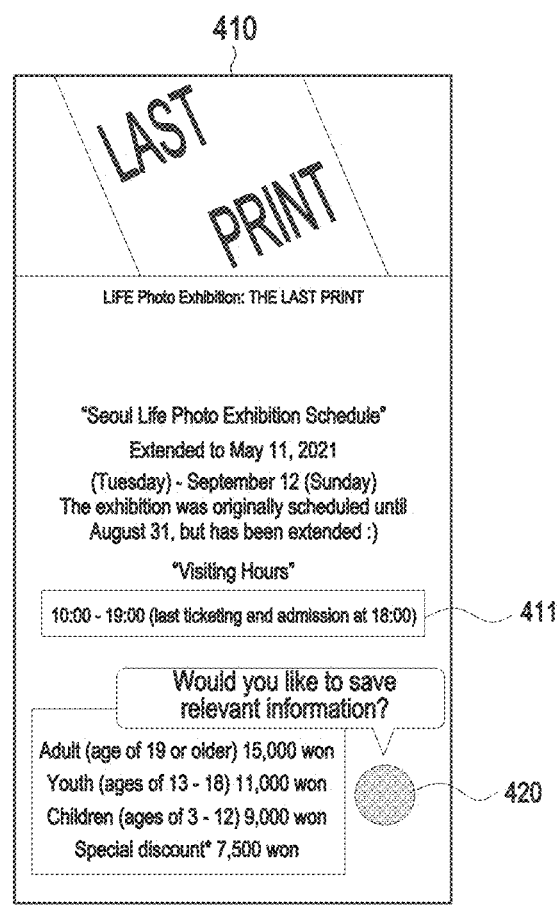
FIG. 4A is a diagram for illustrating an operation of acquiring information included in a content displayed on a display of an electronic device, according to an embodiment.

FIG. 4A is a diagram for illustrating an operation of acquiring information included in a content displayed on a display of an electronic device, according to an embodiment.

Figure 4B:
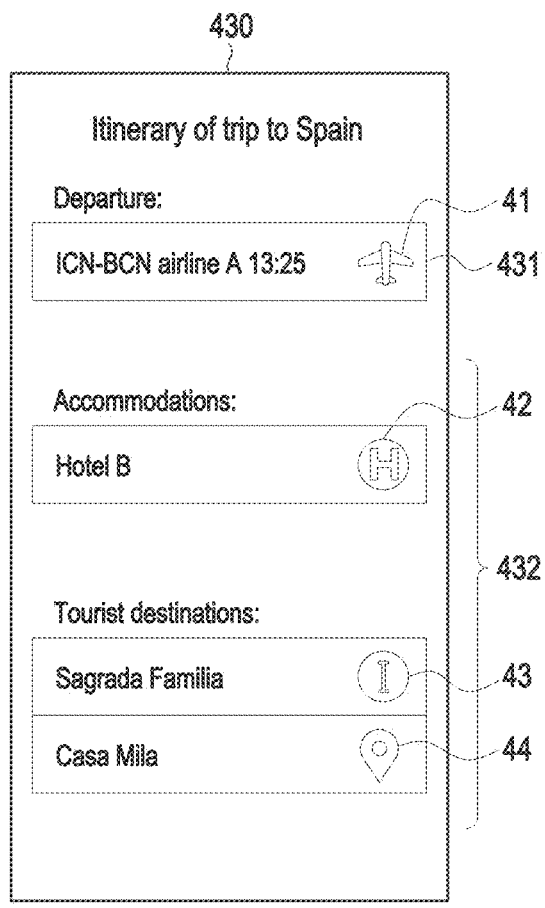
FIG. 4B is a diagram for illustrating an operation of arranging multiple items acquired based on information included in a content of an electronic device according to a priority and displaying the arranged multiple items, according to an embodiment.

FIG. 4B is a diagram for illustrating an operation of arranging multiple items acquired based on information included in a content of an electronic device according to a priority and displaying the arranged multiple items, according to an embodiment.

Figure 4C:
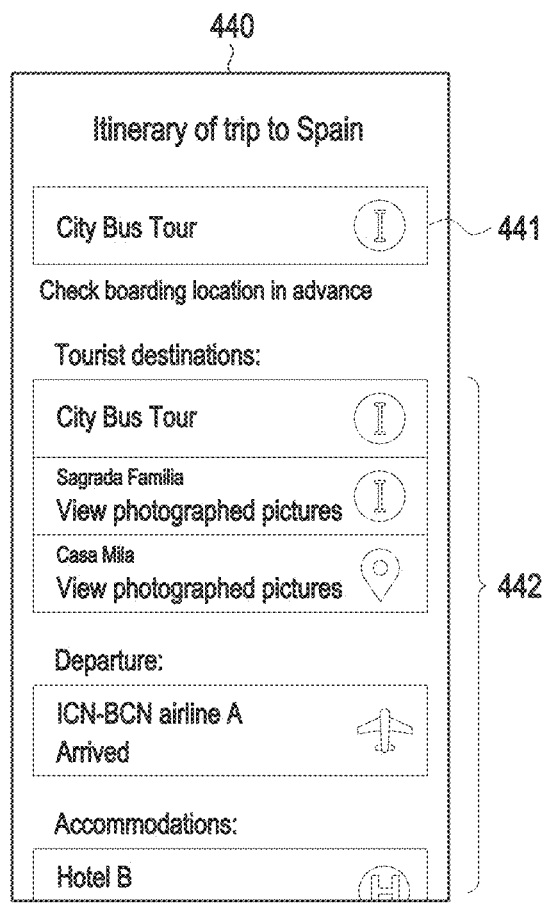
FIG. 4C is a diagram for illustrating an operation of rearranging, based on a changed priority, the arranged multiple items and displaying the rearranged multiple items, according to an embodiment.

FIG. 4C is a diagram for illustrating an operation of rearranging, based on a changed priority, the arranged multiple items and displaying the rearranged multiple items, according to an embodiment.

Referring to FIG. 2, in operation 210, an electronic device (e.g., the electronic device 101 of FIG. 1 or the processor 120 of FIG. 1) may acquire information included in a content displayed on a display (e.g., the display module 160 of FIG. 1) based on the content satisfying a configured condition.

According to an embodiment, if the content includes at least one of time information, place information, or an event name, the electronic device may determine that the configured condition is satisfied, and may acquire the information included in the content. According to an embodiment, when the content is selected via a user input (e.g., a drag input or a long press input), the electronic device may acquire information included in the selected content.

According to an embodiment, as illustrated in FIG. 4A, the electronic device may display a screen 410 including the content on the display. For example, the screen 410 may include an application execution screen.

According to an embodiment, if a content 411 included in the screen 410 satisfies the configured condition, the electronic device may acquire information included in the content 411. For example, if the content 411 included in the screen 410 satisfies the configured condition, the electronic device may acquire information included in the content 411 even without receiving the user input.

According to an embodiment, the electronic device may acquire information included in the content 411 through the user input. For example, if the content 411 included in the screen 410 satisfies the configured condition or is selected by the user input, the electronic device may display a user interface 420 for storing of the content 411 in a partial area of the display so as to be overlaid with a part of the screen 410.

According to an embodiment, when a user input to select the user interface 420 is received, the electronic device may highlight the acquired content 411, or if the user selects the content 411, the content 411 may be highlighted.

According to an embodiment, when the user input to select the user interface 420 is received again after highlighting the content 411, the electronic device may acquire information included in the highlighted content 411.

According to an embodiment, after highlighting the content 411, the electronic device may display at least one pre-stored group, and upon reception of a user input to select a group (e.g., a schedule and/or a purchase list) in which information included in the content 411 is to be included, the electronic device may acquire the information included in the highlighted content 411 and may add the acquired information to the selected group. For example, the at least one pre-stored group may be generated by a user input, and each group may include information input by the user. According to an embodiment, the at least one pre-stored group may include a group related to a first schedule input by the user, a group related to a second schedule input by the user, and/or a group related to a purchase list input by the user. For example, the groups related to the schedules may include information input by the user via a calendar application, and the group related to the purchase list may include a goods list input by the user via a memo application.

According to an embodiment, the group related to the first schedule and/or the group related to the second schedule may include schedule information, place information, weather information, and/or an event name which are related to each schedule. For example, the group related to the purchase list may include information related to goods to be purchased, information on a place where the goods can be purchased, and/or discount information.

According to an embodiment, if there is one pre-stored group, the electronic device may highlight the content 411 and may display the pre-stored one group, and when a user input to select the displayed one group is received, the electronic device may add information included in the content 411 to the selected group.

According to an embodiment, an embodiment of acquiring information included in a displayed content will be described below with reference to FIG. 5A to FIG. 6.

According to an embodiment, the electronic device may acquire information included in a content by analyzing at least one of an image or text included in the content. According to an embodiment, the electronic device may group information included in contents acquired via multiple screens. For example, the electronic device may group information included in contents acquired via multiple screens into one schedule or one purchase list. For example, if a first content included in an execution screen of a first application displayed on the display satisfies the configured condition, the electronic device may acquire information included in the first content, and if a second content included in an execution screen of a second application displayed on the display concurrently with or after the first application satisfies the configured condition, the electronic device may acquire information included in the second content. According to an embodiment, if the first content or the second content includes at least one of time information, place information, and an event name, the electronic device may determine that the configured condition is satisfied.

According to an embodiment, in operation 220, the electronic device may arrange, based on a first priority, a plurality of items acquired based on information included in the content so as to store the same in a memory (e.g., the memory 130 of FIG. 1). According to an embodiment, the electronic device may determine the first priority, based on a purpose of grouping the information. According to an embodiment, the grouping purpose may be related to a type of a service to be provided to the user via grouping of the information. For example, the electronic device may identify whether the service to be provided Is related to an itinerary, a meeting schedule, and/or a purchase list, based on the text included in the information input by the user and/or the text and/or image included in the information acquired via the displayed content.

According to an embodiment, the first priority may be preconfigured for each grouping purpose. For example, if information is grouped in relation to an itinerary, the first priority may be according to the itinerary. According to an embodiment, if information is grouped in relation to a meeting schedule, the first priority may be configured according to importance of a meeting progress. According to an embodiment, if information is grouped in relation to the purchase list, the first priority may be configured according to importance for purchasing of goods, such as a purchase place for goods to be purchased or a list of goods.

According to an embodiment, the priority may be changed according to a time flow and/or occurrence of a new event (e.g., a change in importance, an information change, and a goods purchase).

According to an embodiment, contents related to the priority will be described in more detail in [Table 1] and operation 230 below.

According to an embodiment, the electronic device may perform classification into the plurality of items, based on details of information included in the content. For example, the electronic device may acquire the plurality of items, based on information included in the first content acquired via the execution screen of the first application and information included in the second content acquired via the execution screen of the second application.

According to an embodiment, the electronic device may group information included in the contents acquired via analysis of at least one of text or images included in the contents into one schedule or one purchase list, and may classify the grouped information into the plurality of items.

According to an embodiment, when acquiring information included in the first content via the first application screen and acquiring information included in the second content via the second application screen, the electronic device may group the information included in the first content and the information included in the second content into one schedule or one purchase list. For example, the electronic device may perform grouping into one schedule or one purchase list, based on keywords and/or schedule information of the information included in the first content and the information included in the second content.

According to an embodiment, grouping of information refers to classification of acquired information, and the electronic device may group information, based on relevance between respective pieces of information. For example, if at least some of the plurality of pieces of the information included in each content is the same, or similar in time and/or location even if the information is not the same, the electronic device may determine that there is relevance between respective pieces of information.

According to an embodiment, if information included in a content included in a screen of an airline application and location information and/or schedule information of information included in a content included in a screen of a social network service (SNS) application are correlated with each other, the electronic device may group the information into one schedule.

According to one embodiment, information of goods, which is displayed multiple times on the screen of the SNS application or is included in a content included in a screen displayed by the user's search, and a content, which is displayed multiple times on a screen of a shopping application or is included in the screen displayed by the user's search, indicate that the user has a purchase intention, the electronic device may group the information and the content into the purchase list. According to an embodiment, when the content displayed on the screen of the SNS application includes information related to goods for a travel to a specific place, and a content displayed on an Internet application screen includes information related to the goods for the travel to the specific place, the electronic device may group information included in the two contents into one purchase list, based on relevance of the place.

According to an embodiment, the plurality of items may include schedules (e.g., a flight date/time and a meeting date/time), places (e.g., accommodation, tourist attractions, meeting places, parking lots, and restaurants), to-do lists, attendees, weather, discount information, and/or checklists.

According to an embodiment, the electronic device may classify the grouped information into the plurality of items according to a grouping purpose. For example, if grouped into the itinerary, the electronic device may classify the grouped information into the plurality of items including a flight date/time, accommodation, a tourist destination, weather, a restaurant, a traffic condition, and/or a checklist (e.g., preparations). According to an embodiment, if grouped into the meeting schedule, the electronic device may have grouped information including a meeting date/time, a meeting place, attendees, a traffic condition, and/or a checklist (e.g., tasks and materials). According to an embodiment, if grouped into the purchase list, the electronic device may classify grouped information into the plurality of items including a purchase place and/or a purchase list. Types of the plurality of items described above are merely examples and are not limited thereto.

According to an embodiment, the electronic device may acquire the plurality of items by further including information received from an external server (e.g., the server 108 of FIG. 1) via a communication module (e.g., the communication module 190 of FIG. 1). For example, the electronic device may receive weather information, time information, flight information, place information (e.g., parking lot information and restaurant information), and/or discount information from the external server via the communication module, and may acquire the plurality of items by further including the received information. For example, the electronic device may perform grouping into one schedule or one purchase list by further including information received from the external server, and may classify the grouped information into the plurality of items. Accordingly, the plurality of items may be acquired by further including information that is not displayed on the display.

According to an embodiment, the electronic device may receive a user input to input information via the display, and may acquire the plurality of items by further including information input via the user input. For example, when the electronic device receives a user input to input a schedule via the calendar application displayed on the display or for inputting a purchase list through the memo application, the electronic device may perform grouping into one schedule or one purchase list by further including information input via the user input and may classify the grouped information into the plurality of items.

According to an embodiment, the information acquired via the content displayed on the display, the information received from the external server, and/or the information acquired by the user input may be classified into the plurality of items (e.g., related items in Table 1) as shown in [Table 1] below according to the type of information.

TABLE 1

| Extracted information | Usage schemes | Associated linkage fields |
|---|---|---|
| Detailed places and locations | Specifying detailed locations | Place |
| Traffic situations | Recommending an alternative place in consideration of a traffic situation | |
| Parking situations | Recommending a nearby parking lot due to full parking lots | |
| Phone number/business hours | Using as detailed place information | |
| Weather | Changing a place | |
| Changing a schedule | Applying a change in a booked schedule | Schedule |
| Nearby must-visit restaurant locations, recommended menu items, business hours, and nearby event information | Specifying an itinerary in more detail, such as applying a detailed schedule within the itinerary and adding a detailed schedule | |
| Recommending a menu item | Recommending an action to be taken during a schedule | Detailed schedules |
| Recommending payment discount | | |
| Related checklists | Specifying and recommending a preparation item | To do (preparation) Detailed actions |
| Related product discount information | | |
| Related product discount information | Changing a to-do priority according to a discount period | |
| Changes via an email message | Recommendations for recognizing key changes before attending a schedule event | |
| Changes of attachment | | |
| Unread related emails | | |

According to an embodiment, referring to [Table 1], the electronic device may use information in different ways according to a type of acquired information.

According to an embodiment, the electronic device may arrange the plurality of items, based on the first priority. For example, the electronic device may arrange the plurality of items, based on the preconfigured first priority. According to an embodiment, in a case of the plurality of travel-related items, the first priority may be based on the itinerary. For example, the itinerary may be arranged so that an item related to a departure schedule of the travel has the highest priority, and items related to schedules to be progressed for the travel have priorities in chronological order.

According to an embodiment, in a case of the plurality of items related to the meeting, the first priority may be configured according to importance, and the electronic device may arrange a date/time item related to the meeting to have the highest priority, a place item to have a second highest priority, and an attendee item to have a subsequent priority.

According to an embodiment, in a case of the plurality of items related to the purchase list, the electronic device may arrange the first priority so that a place item, at which goods included in the purchase list can be purchased, has the highest priority and a list of goods to be purchased has a subsequent priority.

According to an embodiment, when the user input to check the itinerary or the purchase list is received, the electronic device may display the plurality of items arranged based on the first priority, as illustrated in FIG. 4B.

Referring to FIG. 4B, the electronic device may display a screen 430 for checking the itinerary. According to an embodiment, the screen 430 may include the plurality of items 431 and 432 arranged based on the first priority. According to an embodiment, the plurality of items 431 and 432 may include links for providing summary information related to the items and/or detailed information related to the items, respectively. For example, the links may include icons 41, 42, 43, and 44 of applications that provide the detailed information related to the items.

According to an embodiment, the first priority may be based on a sequence of an itinerary according to time, and the departure flight date/time item 431 related to a departure schedule may be arranged to have the highest priority, and the subsequent priority item 432 may include an accommodation item and a tourist destination item which are sequentially arranged.

According to an embodiment, in operation 230, if a current time point satisfies the configured condition, the electronic device may rearrange the plurality of items, based on the second priority. According to an embodiment, the electronic device may rearrange the plurality of items over time (e.g., a time line). For example, the configured condition may be arrival of a specific time point related to the itinerary. According to an embodiment, monitoring is performed by comparing a current time, which is measured by the electronic device itself or received from a time-related server, with time point information related to the itinerary stored for each item, and if arrival of the time point information related to the itinerary is determined, it may be determined that the configured condition is satisfied.

According to an embodiment, the second priority may be based on a matter related to the itinerary, which is required to be checked at a current time point, and may correspond to the plurality of items rearranged so that an item related to the matter required to be checked have the highest priority. For example, if there is a matter required to be checked at a specific time point (e.g., 3 days before a schedule, a scheduled day, and 3 hours before the schedule), which is related to the itinerary, for each item, the electronic device may, when the specific time point arrives, rearrange the plurality of items and provide a notification, based on the second priority in which a priority of a corresponding item has the highest priority. According to an embodiment, as for orders after the highest priority in the second priority, items related to the matter required to be checked may be sequentially arranged over time or the pre-arranged sequence based on the first priority may be maintained.

According to an embodiment, the electronic device may acquire information required to be checked at the specific time point related to the itinerary, via information input by the user or information acquired from the content. For example, the electronic device may acquire text information stating that, in a case of cancellation via a content included in a screen of a booking application, a time point at which 100% refund is available is one week before a booked schedule, and information on the time point may be stored in the memory. According to an embodiment, the electronic device may perform monitoring of comparing a current time point with time point information of one week before a booked accommodation schedule, and may rearrange the plurality of items so that items related to accommodation have the highest priority one week before the booked accommodation schedule.

According to an embodiment, as for the second priority, an item related to the matter required to be checked may have the highest priority, and for subsequent items, items related to matters required to be checked over time may be sequentially arranged, or the pre-arranged sequence based on the first priority may be maintained except for the item related to the matter required to be checked.

According to an embodiment, if the current time point is before a first period (e.g., 3 days before the start of the schedule) of a time point related to one schedule, the electronic device may rearrange the plurality of items, based on the second priority, and if the current time point is before a second period (e.g., 1 day before the start of the schedule) that is shorter than the first period of the time point related to one schedule, the electronic device may rearrange the plurality of items, based on a third priority. According to an embodiment, rearranging of the plurality of items related to a travel or a meeting over time will be described below with reference to FIG. 8A to FIG. 10D.

In the above, it has been described that operation 230 is rearranging of the plurality of items which have been arranged based on the first priority over time via operation 220. However, according to an embodiment, the plurality of items rearranged over time may be rearranged as more time passes, and hereinafter, the plurality of items rearranged by an information change in operation 330 of FIG. 3 may be rearranged over time.

In the above, it has been described that, after operation 210 of acquiring information, operation 220 of arranging the plurality of items and operation 230 of rearranging the plurality of arranged items are performed. However, according to an embodiment, acquiring of information may be performed even after the plurality of items are arranged based on the first priority, and acquiring of information may be performed also after the plurality of arranged items are arranged based on the second priority.

According to an embodiment, in operation 240, the electronic device may display the plurality of rearranged items on the display.

According to an embodiment, when the plurality of items are rearranged, the electronic device may control the display to display a notification of the rearrangement, and when a user input to select the notification is received, the electronic device may control the display to display the plurality of rearranged items. According to an embodiment, displaying of the notification of the rearrangement of the plurality of items and displaying of the rearranged items according to a notification selection will be described below with reference to FIG. 7A to FIG. 7D.

For example, as illustrated in FIG. 4C, when the user input to check information changed in relation to the itinerary is received, the electronic device may display a screen 440 for checking the itinerary. According to an embodiment, the screen 440 may include the plurality of items 441 and 442 arranged based on the second priority.

According to an embodiment, the second priority may be based on the matter related to the itinerary, which is required to be checked at the current time point, and may correspond to the plurality of items 441 and 442 rearranged so that the traffic item 441 related to the matter required to be checked has the highest priority. According to an embodiment, as for the second priority, the item 441 related to the matter required to be checked may have the highest priority, and for the subsequent item 442, items related to matters required to be checked over time may be sequentially arranged, or the pre-arranged sequence based on the first priority may be maintained.

Figure 3:
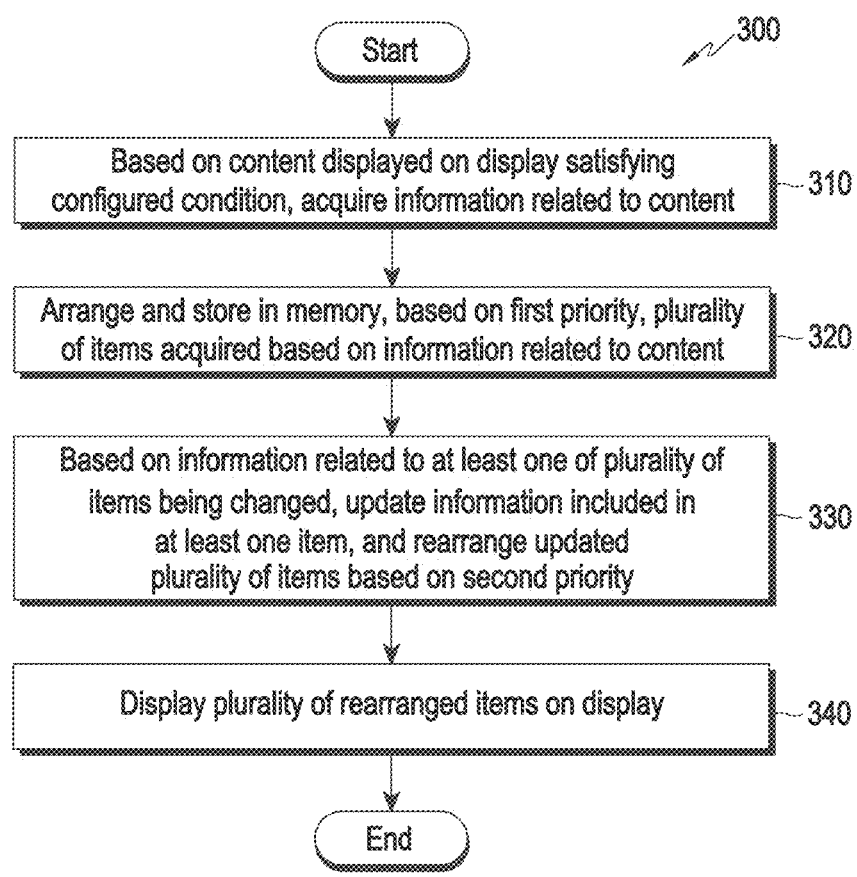
FIG. 3 is a flowchart for illustrating an operation of an electronic device for rearranging multiple items, based on a change of information according to an embodiment.

FIG. 3 is a flowchart 300 for illustrating an operation of an electronic device for rearranging the plurality of items, based on a change of information according to an embodiment.

Referring to FIG. 3, in operation 310, an electronic device (e.g., the electronic device 101 of FIG. 1 or the processor 120 of FIG. 1) may acquire information included in a content displayed on a display (e.g., the display module 160 of FIG. 1) if the content satisfies a configured condition.

Since operation 310 of FIG. 3 is the same as operation 210 of FIG. 2 described above, a redundant description will be omitted.

According to an embodiment, in operation 320, the electronic device may arrange, based on a first priority, the plurality of items acquired based on information included in the content so as to store the same in a memory (e.g., the memory 130 of FIG. 1).

Operation 320 of FIG. 3 is the same as operation 220 of FIG. 2 described above, and will be thus omitted.

According to an embodiment, in operation 330, when information related to at least one of the plurality of items is changed, the electronic device may update information included in the at least one item, and may rearrange the plurality of updated items based on a second priority.

According to an embodiment, when an event occurs in which the information included in the at least one of the plurality of items is changed, the electronic device may rearrange the plurality of items so that the item in which the information is changed has the highest priority.

According to an embodiment, when the electronic device receives the changed information for at least one of the plurality of items from an external server (e.g., the server 108 of FIG. 1) via a communication module (e.g., the communication module 190 of FIG. 1), the electronic device may identify that the event has occurred and may rearrange the plurality of items so that the item for which the event has occurred has the highest priority. For example, when change information, such as change information of a weather item, change information of a place item (e.g., parking lot information), or discount information, is received from the external server, the electronic device may change the corresponding item to have the highest priority.

According to an embodiment, in a case of the plurality of items related a purchase list, when discount information is received from the external server in a state where the place item has the highest priority and a purchase goods list item has a subsequent priority according to the first priority, the electronic device may change information of a corresponding item while maintaining the sequence of the item. For example, the electronic device may change information on the place item having the highest priority to information on a place where a discount is performed, and may change priority of goods in the purchase goods list item so that discounted goods has a higher priority.

According to an embodiment, when information included in the content displayed via the display is changed, the electronic device may identify that an event has occurred, and may rearrange the plurality of items so that an item for which the event has occurred has the highest priority. For example, in a case of the plurality of items related to a schedule, if the electronic device acquires information included in the content displayed on the display, and the information included in the content is for changing of at least one piece of information in the plurality of pre-stored items, the electronic device may rearrange the plurality of items so that an item, in which information has been changed, has the highest priority. For example, if time information of the schedule (e.g., exhibition) on an application (e.g., Internet) execution screen is different from pre-stored time item information, the electronic device may rearrange the plurality of items so that the time item has the highest priority. According to an embodiment, the electronic device may change the pre-stored time item information to time information included in the content, or may determine whether to change time item information according to a user input to select the pre-stored time item information or the time information included in the content. According to an embodiment, in a case of the plurality of items related to the purchase list, when at least one of the plurality of goods included in the purchase goods list is purchased online, the electronic device may acquire information related to the purchased goods from a payment screen displayed on the display, may delete the purchased goods from among the plurality of goods included in the purchase goods list, and may change a sequence of goods in the purchase goods list.

According to an embodiment, when a user input to change at least one piece of information among the pre-stored the plurality of items is received, the electronic device may identify that an event has occurred and may rearrange the plurality of items so that an item in which the event has occurred has the highest priority. For example, in the case of the plurality of items related to the schedule, when a user input to change time information or place information is received, the electronic device may rearrange the plurality of items so that an item in which information has been changed has the highest priority. According to an embodiment, in the case of the plurality of items related to the purchase list, when a user input to delete some goods from the purchase goods list is received, the electronic device may delete some goods from the purchase goods list and change the sequence of the goods.

According to an embodiment, based on change information acquired via the content displayed on the display, change information received from the external server, and/or change information by the user input, items and/or item information may be changed as shown in [Table 2] below.

TABLE 2

| Recommended types | Associated information | Detailed recommendations |
|---|---|---|
| Change Changing information of a basic item | Weather → place | Changing a place due to a weather change |
| | Parking information → place | Recommending a nearby parking lot due to full parking lots |
| | Information of surroundings → schedule | Changing a schedule due to a traffic situation/a change in business hours |
| | Changing schedule information → schedule | Applying a schedule change via a message and an e-mail for a change of a schedule |
| Specifying Specifying information of existing items | Recommended menu information → detailed actions | Presenting recommendations useful when carrying out a schedule, via recommended menu items of must-visit restaurants |
| | Recommending must-visit restaurants → detailed actions | Recommending destinations or specific places/courses to visit |
| | Payment discount information → detailed actions | Specifying actions via payment discount information when carrying out a schedule |
| Prioritization Changing priority of an existing item | Discount information | Changing purchase priorities in a to-do list based on discount product information |
| | Relevant up-to-date information that has not been checked (emails and documents) | Changing a priority order of unchecked important information among information to be checked before starting a schedule |

In the above, it has been described that operation 330 is rearranging of the plurality of items arranged based on the first priority via operation 320, according to a change of information. However, according to an embodiment, when at least one piece of information from among the plurality of items rearranged in operation 230 of FIG. 2 is changed, arrangement may be performed according to operation 330, and after the plurality of items are rearranged according to the change of the information, when a new information change occurs, rearrangement may be performed based on the new information change.

According to an embodiment, in operation 340, the electronic device may display the plurality of rearranged items on the display.

Operation 340 of FIG. 3 is the same as operation 240 of FIG. 2 described above, and will be thus omitted.

According to an embodiment, rearrangement of the plurality of items over time, which is operation 230 of FIG. 2, and rearrangement of the plurality of items due to the information change, which is operation 330 of FIG. 3, may be performed twice or more with respect to one schedule or one purchase list, and this will be described with reference to FIG. 8A to FIG. 11C.

Figures 5A, 5B:
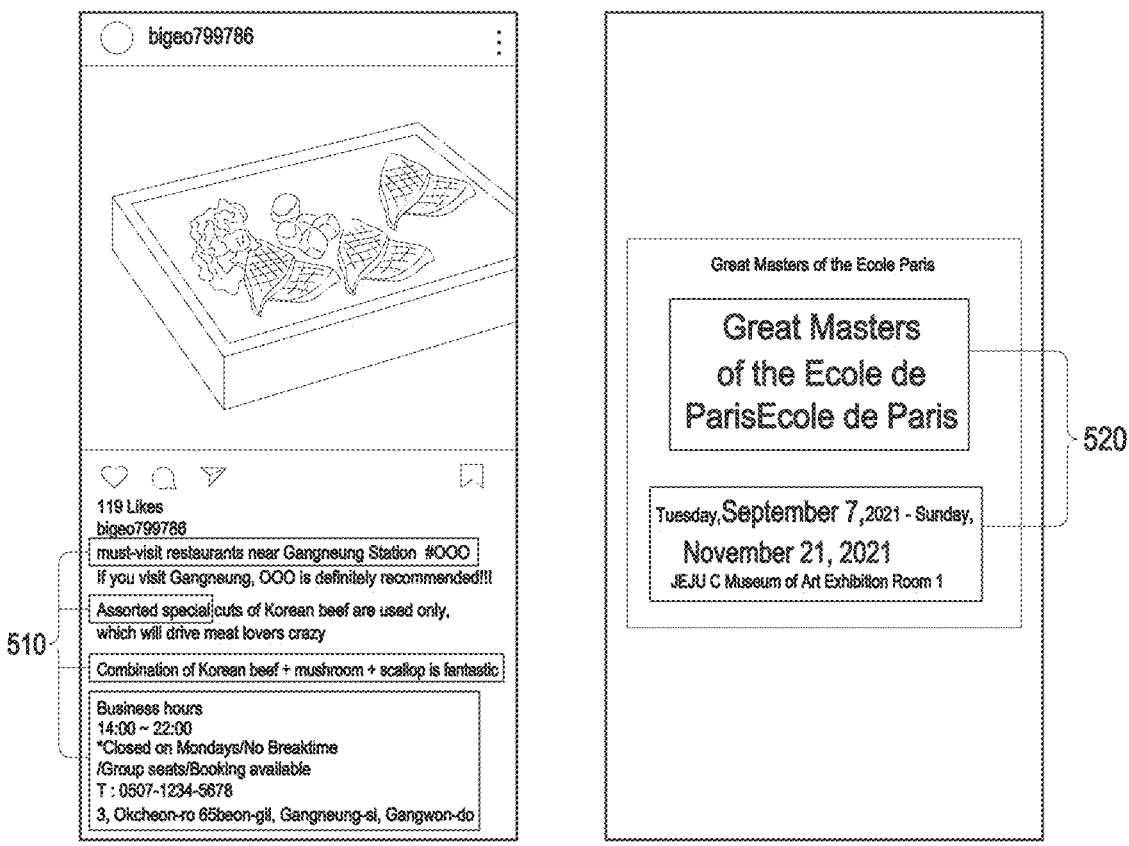
FIG. 5A is a diagram for illustrating an operation of acquiring information included in a content displayed on a display of an electronic device, according to an embodiment.
FIG. 5B is a diagram for illustrating an operation of acquiring information included in a content displayed on the display of the electronic device, according to an embodiment.

FIG. 5A is a diagram for illustrating an operation of acquiring information included in a content displayed on a display of an electronic device, according to an embodiment.

Referring to FIG. 5A, an electronic device (e.g., the electronic device 101 of FIG. 1 or the processor 120 of FIG. 1) may display an execution screen of an application (e.g., an SNS application or an Internet application) on a display (e.g., the display module 160 of FIG. 1).

According to an embodiment, the electronic device may acquire information included in a content (e.g., an image or text) included in the execution screen of the application. For example, the electronic device may acquire restaurant-related information 510 including information on surroundings, business hours, location information, phone number, and/or a combination of recommended menu items included in the displayed content.

According to an embodiment, the electronic device may recognize a positive content or a negative content via analysis of the content (e.g., an image or text) and may classify information included in the content. For example, if the content includes text, such as "recommended", "must-visit restaurant", and/or "satisfied", the electronic device may recognize the same as a positive content so as to acquire information, and if the content includes text or an image, such as star symbols (e.g., ★★★☆☆), the electronic device may acquire information by selecting a positive content, based on the number of stars in the star symbols.

FIG. 5B is a diagram for illustrating an operation of acquiring information included in a content displayed on the display of the electronic device, according to an embodiment.

Referring to FIG. 5B, the electronic device may display an execution screen of an application (e.g., an SNS application or an Internet application) on the display.

According to an embodiment, the electronic device may acquire information included in a content (e.g., an image or text) included in the execution screen of the application. For example, the electronic device may acquire exhibition-related information 520 including an event name, schedule information including date and time, and/or location information, which are included in the displayed content.

Figure 5C:
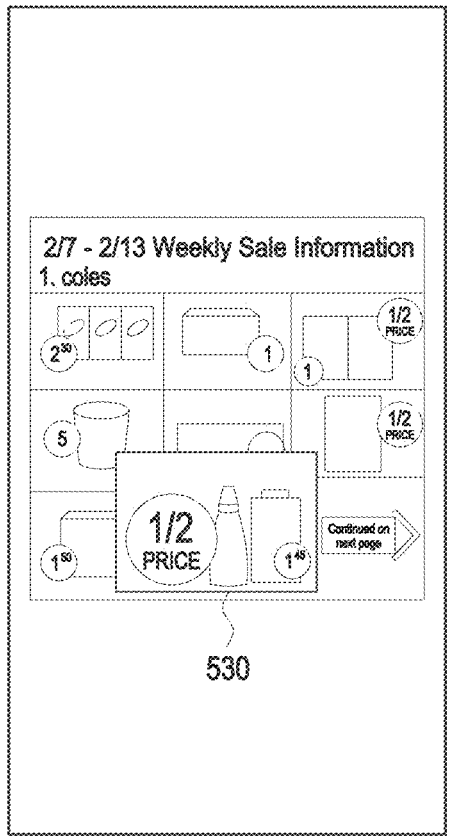
FIG. 5C is a diagram for illustrating an operation of acquiring information included in a content displayed on the display of the electronic device, according to an embodiment.

FIG. 5C is a diagram for illustrating an operation of acquiring information included in a content displayed on the display of the electronic device, according to an embodiment.

Referring to FIG. 5C, the electronic device may display an execution screen of an application (e.g., an SNS application or an Internet application) on the display.

According to an embodiment, the electronic device may acquire information included in a content (e.g., an image or text) included in the execution screen of the application. For example, the electronic device may acquire discount information 530 including a discount period, a discount store location, a discount product, and/or a discount rate, which are included in the displayed content.

Figure 5D:
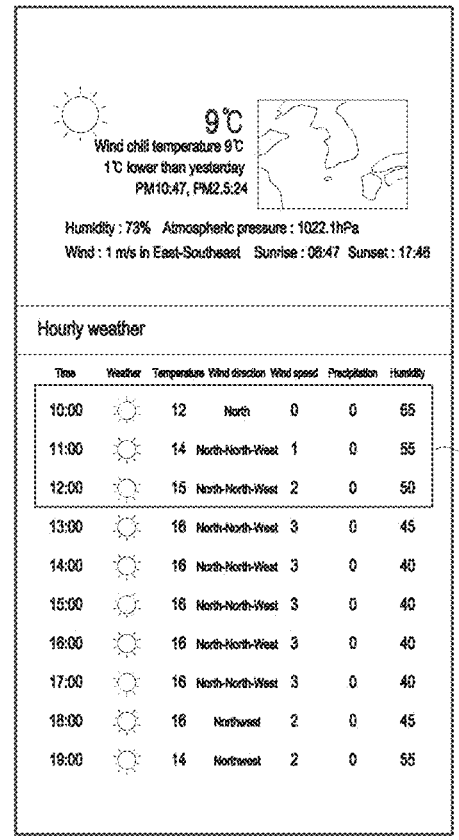
FIG. 5D is a diagram for illustrating an operation of acquiring information included in a content displayed on the display of the electronic device, according to an embodiment.

FIG. 5D is a diagram for illustrating an operation of acquiring information included in a content displayed on the display of the electronic device, according to an embodiment.

Referring to FIG. 5D, the electronic device may display an execution screen of an application (e.g., a weather application or an Internet application) on the display.

According to an embodiment, the electronic device may acquire information included in a content (e.g., an image or text) included in the execution screen of the application. For example, the electronic device may acquire weather information 540 including location information, time information, weather information, temperature information, wind direction information, wind speed information, precipitation information, and/or humidity information, which are included in the displayed content. For example, the acquired weather information 540 may be related to one schedule.

Figure 5E:
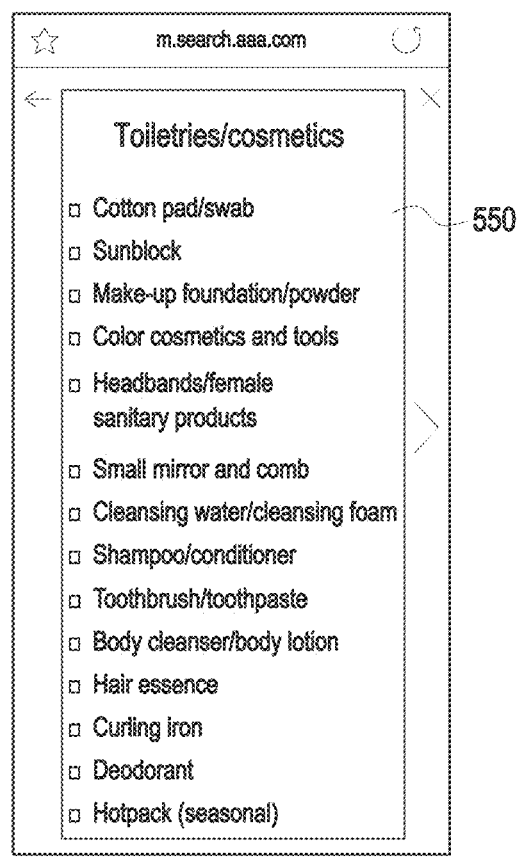
FIG. 5E is a diagram for illustrating an operation of acquiring information included in a content displayed on the display of the electronic device, according to an embodiment.

FIG. 5E is a diagram for illustrating an operation of acquiring information included in a content displayed on the display of the electronic device, according to an embodiment.

Referring to FIG. 5E, the electronic device may display an execution screen of an application (e.g., an Internet application, a document application, or a memo application) on the display.

According to an embodiment, the electronic device may acquire information included in a content (e.g., an image or text) included in the execution screen of the application. For example, the electronic device may acquire a checklist 550 including a list of preparations included in the displayed content. For example, the acquired checklist 550 may be related to one schedule or one purchase list.

As described above, the electronic device may acquire information that is highly related to a user's interest by acquiring information included in the content displayed on the display.

Figure 6:
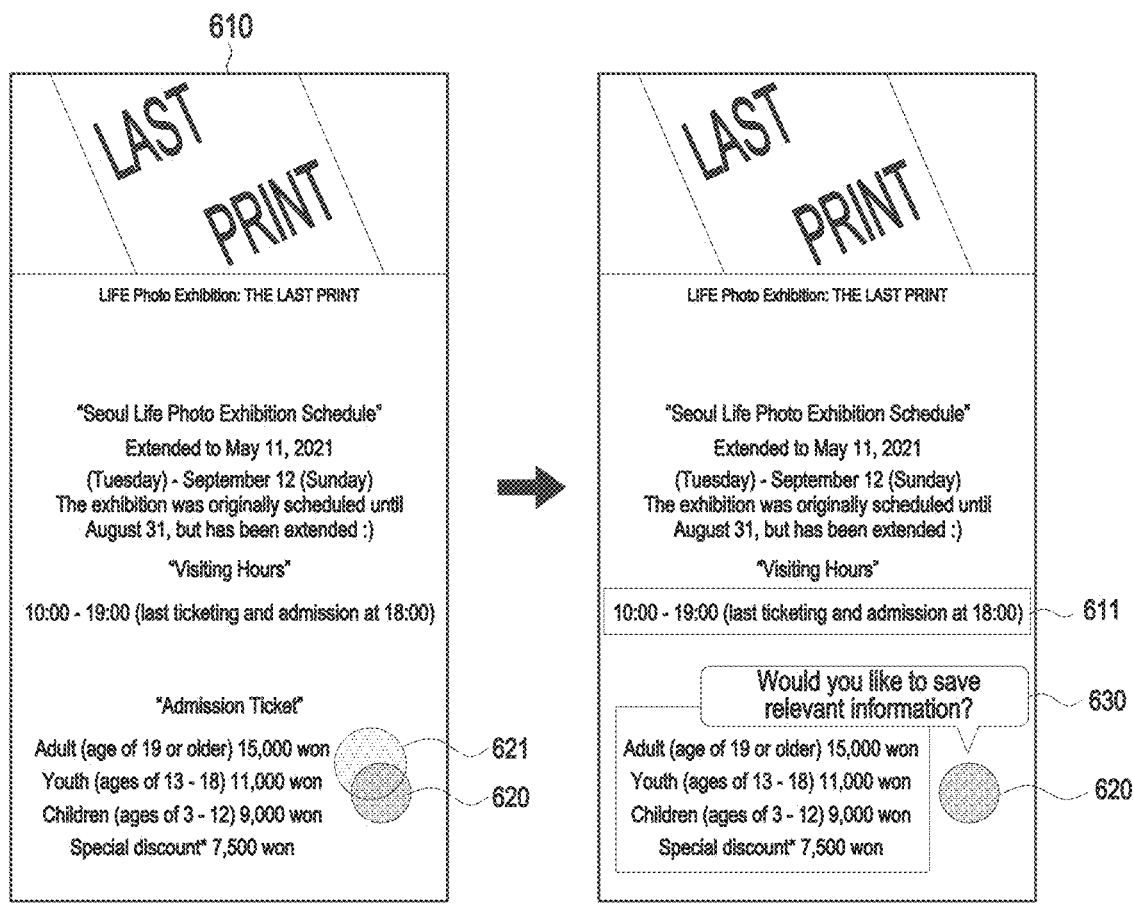
FIG. 6 is a diagram for illustrating an operation of acquiring information included in a content displayed on a display of an electronic device, according to an embodiment.

FIG. 6 is a diagram for illustrating an operation of acquiring information included in a content displayed on a display of an electronic device, according to an embodiment.

Referring to FIG. 6, an electronic device (e.g., the electronic device 101 of FIG. 1 or the processor 120 of FIG. 1) may display an application execution screen 610 on a display (e.g., the display module 160 of FIG. 1). According to an embodiment, if a content that satisfies a configured condition is included in the application execution screen 610, the electronic device may display a user interface 620 for acquiring information included in the content, in a partial area of the display so as to be overlaid with a part of the application execution screen 610.

According to an embodiment, when a user input 621 for selecting the user interface 620 is received, the electronic device may highlight a content 611 that satisfies the configured condition, and may display a message 630 (e.g., "Do you want to save relevant information?") for asking whether to acquire information included in the highlighted content 611 around the user interface 620.

According to an embodiment, after displaying of the message 630, when a user input to select the user interface 620 is received, the electronic device may acquire information included in the highlighted content 611.

In the above, it has been illustrated and described that the user interface 620 is displayed, and then the content 611 satisfying the configured condition is highlighted. However, according to an embodiment, in a case where a user selects a content for which information is to be acquired, when a user input (e.g., a drag or a long press) for selecting the content is received, the electronic device may highlight the selected content and display the user interface 620 for acquiring information included in the content. According to an embodiment, when the user input to select the content is received, a message for asking whether to acquire information may not be displayed.

According to an embodiment, when multiple groups (e.g., an information group related to a travel to Spain, or an information group related to a meeting) in which information has been grouped are stored in a memory (e.g., the memory 130 of FIG. 1), the electronic device may display a list of the stored multiple groups in addition to or by replacing a message 630 display operation for asking whether to acquire information, and if a user input to select one group among the multiple groups included in the list is received, the electronic device may add information included in the highlighted content to the selected group. According to an embodiment, when the user input to select the content is received, and then the user input to select the user interface 620 is received, the electronic device may display the list of multiple groups around the user interface 620, and when the user input to select one group from among the multiple groups included in the list is received, the electronic device may add information included in the highlighted content to the selected group.

Figure 7A:
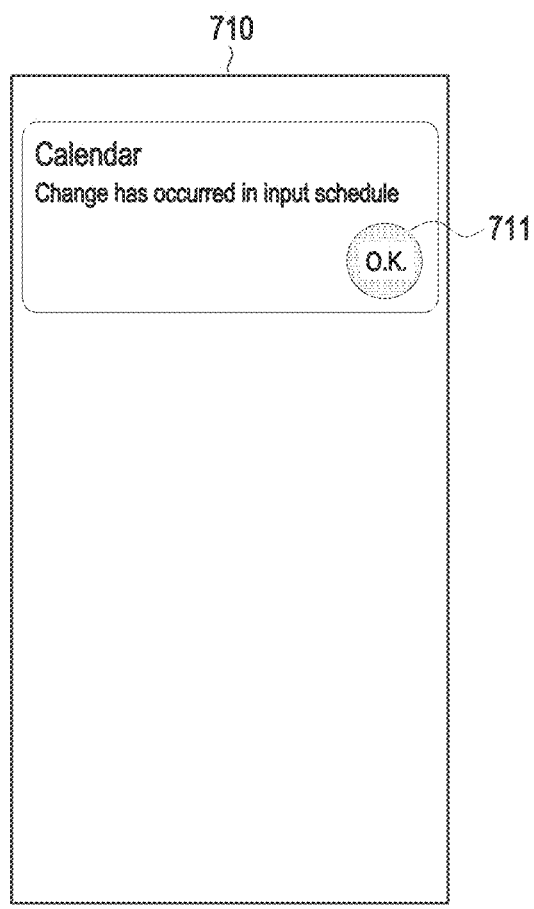
FIG. 7A is a diagram for illustrating an operation of an electronic device when multiple items are rearranged based on changed priorities, according to an embodiment.

FIG. 7A is a diagram for illustrating an operation of an electronic device when the plurality of items are rearranged based on a changed priority, according to an embodiment.

Referring to FIG. 7A, if priorities of the plurality of items arranged based on a first priority is changed so as to be arranged based on a second priority, the electronic device (e.g., the electronic device 101 of FIG. 1 or the processor 120 of FIG. 1) may display, on a part of the display, a notification 710 (e.g., "A change has occurred in the input schedule." or "There is a new event related to the input schedule.") indicating that the priorities have been changed. For example, the electronic device may display a notification 710 in a pop-up form. For example, the priorities may be changed over time or based on at least a partial change of information included in the plurality of items.

Figure 7B:
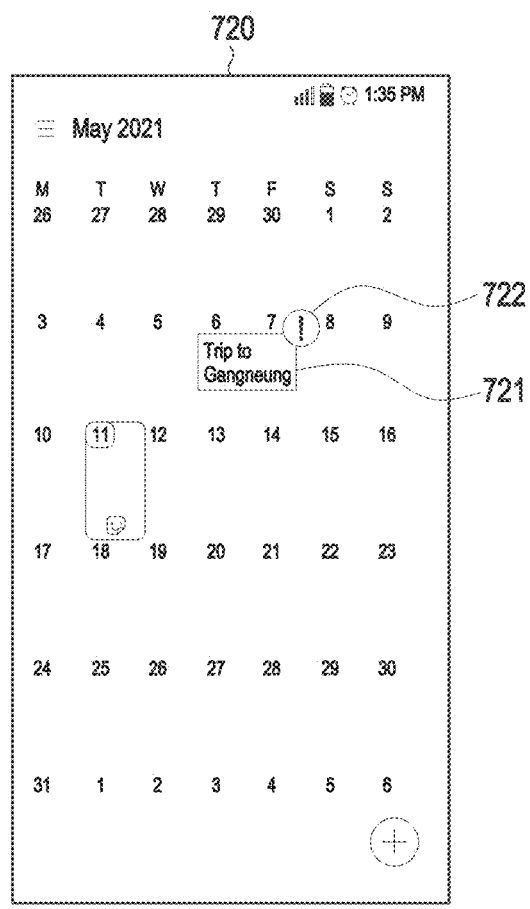
FIG. 7B is a diagram for illustrating an operation of the electronic device when multiple items are rearranged based on changed priorities, according to an embodiment.

According to an embodiment, after the notification 710 is displayed, when a user input 711 for checking changed information is received, an application execution screen for checking of the changed information may be displayed as illustrated in FIG. 7B.

FIG. 7B is a diagram for illustrating an operation of the electronic device when the plurality of items are rearranged based on changed priorities, according to an embodiment.

Referring to FIG. 7B, the electronic device may display an execution screen 720 of an application (e.g., a calendar application), for checking of the changed information. For example, if priorities of the plurality of items related to one schedule is changed, a notification 722 may be displayed on a schedule 721 in which the priorities have been changed.

Figure 7C:
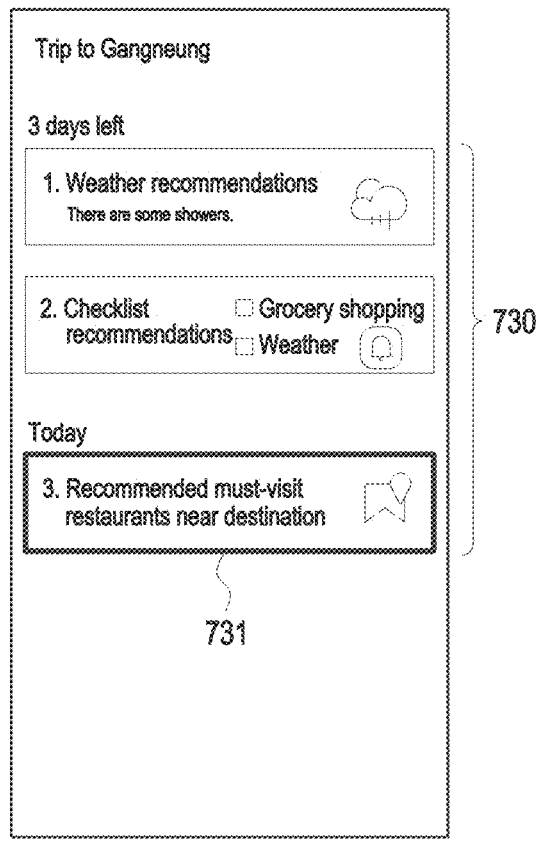
FIG. 7C is a diagram for illustrating an operation of the electronic device when multiple items are rearranged based on changed priorities, according to an embodiment.

According to an embodiment, when the notification 722 is displayed on the schedule 721 in which the priorities have been changed, and then the user input to check the changed information is received, the application execution screen to check for the changed information may be displayed as illustrated in FIG. 7C.

FIG. 7C is a diagram for illustrating an operation of the electronic device when the plurality of items are rearranged based on changed priorities, according to an embodiment.

Referring to FIG. 7C, the electronic device may display the plurality of items 730 related to the selected schedule, based on the priorities. For example, the electronic device may change priorities of the plurality of items over time and may display the plurality of items 730 rearranged based on the changed priorities.

According to an embodiment, the electronic device may change the priorities over time so that an item 731 required to be checked at a current time has the highest priority. For example, if the item required to be checked on a corresponding day is the restaurant item 731, the electronic device may perform rearrangement so that the restaurant item 731 has the highest priority, and a weather item and a checklist item, which had to be checked 3 days ago, have subsequent priorities.

Figure 7D:
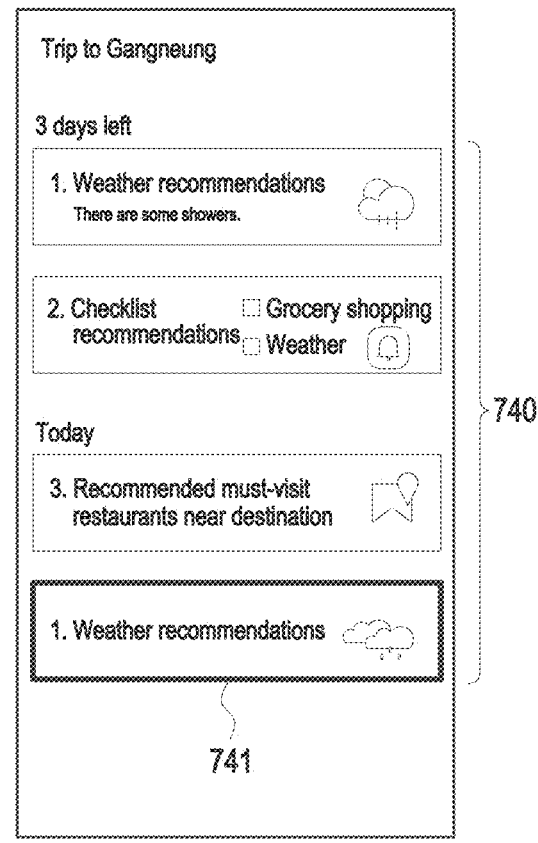
FIG. 7D is a diagram for illustrating an operation of the electronic device when multiple items are rearranged based on changed priorities, according to an embodiment.

FIG. 7D is a diagram for illustrating an operation of the electronic device when the plurality of items are rearranged based on changed priorities, according to an embodiment.

Referring to FIG. 7D, the electronic device may display the plurality of items 740 related to the selected schedule, based on the changed priorities. For example, the electronic device may change the priorities of the plurality of items as information is changed and may display the plurality of items rearranged based on the changed priorities.

According to an embodiment, as information of at least one item among the plurality of items is changed, the electronic device may change the priorities so that the item, the information of which has been changed, has the highest priority. For example, when weather information is changed, the electronic device may rearrange a weather item 741 to have the highest priority. According to an embodiment, the electronic device may maintain the previously arranged plurality of items (e.g., the plurality of items 730 of FIG. 7C) for the subsequent priorities.

Figure 8A:
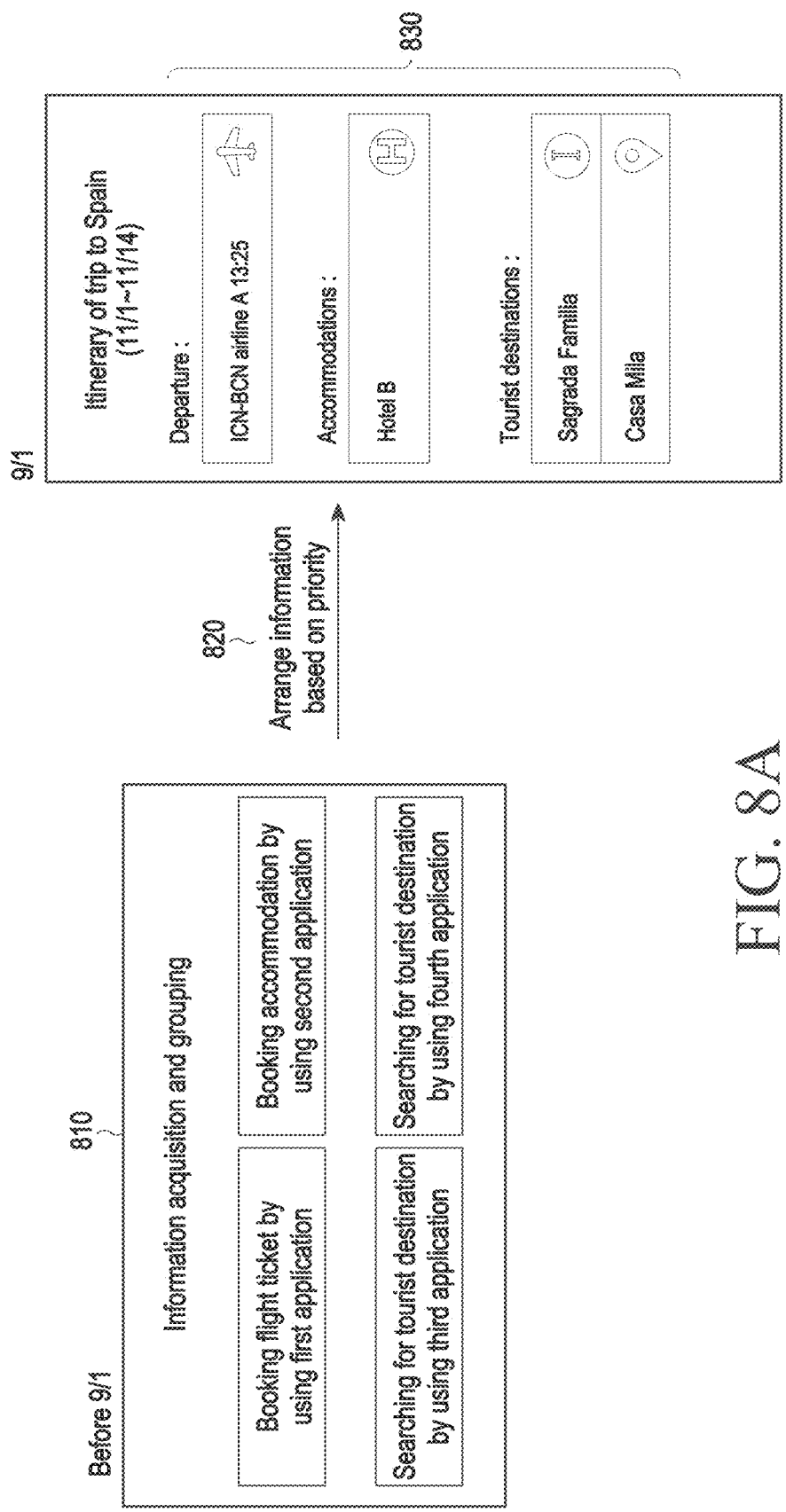
FIG. 8A is a diagram for illustrating electronic device operations of acquiring information, arranging multiple items based on the acquired information according to priorities, and displaying the arranged multiple items, according to an embodiment.

FIG. 8A is a diagram for illustrating electronic device operations of acquiring information, arranging the plurality of items based on the acquired information according to a priority, and displaying the plurality of arranged items, according to an embodiment.

Referring to FIG. 8A, an electronic device (e.g., the electronic device 101 of FIG. 1 or the processor 120 of FIG. 1) may acquire and group 810 information related to an itinerary. According to an embodiment, when a content displayed on a display satisfies a configured condition, the electronic device may acquire and group information included in the content. For example, when a flight ticket is booked via a first application (e.g., an airline application or a booking agency application), the electronic device may acquire destination information and/or date/time information included in an execution screen of the first application.

According to an embodiment, when booking accommodation via a second application (e.g., an accommodation application or the booking agency application), and searching for a tourist destination by using a third application (e.g., an SNS application, an Internet application, the booking agency application, or a map application) and a fourth application (e.g., the SNS application, the Internet application, the booking agency application, and the map application), the electronic device may acquire place information and/or date/time information included in execution screens of the second application to the fourth application.

According to an embodiment, the electronic device may group the acquired information into one group depending on a purpose. For example, the electronic device may group the acquired information into one schedule. According to an embodiment, the electronic device may perform grouping by further adding, to the information acquired via the content, information received from an external server and information acquired by a user input.

According to an embodiment, the electronic device may acquire the tourist destination and the travel date/time via information acquired from the execution screen of the first application, and may acquire movement information of a user according to the user's field of interest and/or date via the execution screens of the second application to the fourth application, and may group the acquired information into one itinerary. For example, the electronic device may acquire, via the acquired information, information that the tourist destination is Spain and the itinerary is from November 1st to November 14.

According to an embodiment, the electronic device may classify the grouped information into the plurality of items. For example, the plurality of items may include a schedule (e.g., a flight date/time and a meeting date/time) item, a place (e.g., accommodations, tourist attractions, meeting places, parking lots, and restaurants) item, a to-do list item, an attendee item, a weather item, a discount information item, and/or a checklist (e.g., preparations) item.

According to an embodiment, the electronic device may arrange 820 information, based on priorities. For example, the electronic device may arrange the plurality of items obtained by classifying the grouped information, based on a configured first priority.

According to an embodiment, in a case of the plurality of travel-related items, the first priority may be based on the itinerary. For example, the itinerary may be arranged so that an item related to a departure schedule of the travel has the highest priority, and items related to schedules to be progressed for the travel have priorities in chronological order.

According to an embodiment, when the electronic device is able to perform grouping into one group (e.g., a schedule or a purchase list) via information acquired for a certain period (e.g., before September 1), the electronic device may classify the acquired information into the plurality of items and arrange the same according to the first priority, and may provide the plurality of arranged items 830 to the user. According to an embodiment, each of the plurality of items 830 may include a link for providing of summary information related to the item and/or detailed information related to the item. For example, the link may include an icon of an application that provides detailed information related to the item.

According to an embodiment, the electronic device may rearrange priorities over time or according to a change of information, which will be described below with reference to FIG. 8B to FIG. 8G.

Figure 8B:
FIG. 8B is a diagram for illustrating electronic device operations of rearranging, based on changed priorities, the multiple items and displaying the rearranged multiple items, according to an embodiment.

FIG. 8B is a diagram for illustrating electronic device operations of rearranging, based on priorities, the plurality of items and displaying the plurality of rearranged items, according to an embodiment. For example, FIG. 8B illustrates a case in which the priorities of the plurality of items are changed according to an information change.

Referring to FIG. 8B, when weather information (e.g., sunny->rain) changed in relation to the schedule (e.g., November 1 to November 14) is received from an external server before the schedule (e.g., October 1), the electronic device may change a method related to the tourist destination to an indoor tourist destination method (e.g., a city bus tour), may rearrange the plurality of items so that a changed tourist destination item 840 has the highest priority, and may indicate that the change of the tourist destination method is recommended due to the change in weather.

Figure 8C:
FIG. 8C is a diagram for illustrating electronic device operations of rearranging, based on changed priorities, the multiple items and displaying the rearranged multiple items, according to an embodiment.

FIG. 8C is a diagram for illustrating electronic device operations of rearranging, based on priorities, the plurality of items and displaying the plurality of rearranged items, according to an embodiment. For example, FIG. 8C illustrates a case in which the priorities of the plurality of items are changed over time.

Referring to FIG. 8C, when a deadline for changing a booked accommodation date arrives, the electronic device may rearrange the plurality of items so that an accommodation item 850 has the highest priority, and may display information (e.g., a scheduled day or two days later) related to the deadline for changing the booked date. For example, the electronic device may identify that the deadline for changing the booked accommodation date has arrived, based on booked date change deadline information acquired from a content displayed during accommodation booking and booked date change deadline information received from the external server related to the accommodation application.

Figures 8D, 8E:
FIG. 8D is a diagram for illustrating electronic device operations of rearranging, based on priorities, the multiple items and displaying the rearranged multiple items, according to an embodiment.
FIG. 8E is a diagram for illustrating electronic device operations of rearranging, based on priorities, the multiple items and displaying the rearranged multiple items, according to an embodiment.

FIG. 8D is a diagram for illustrating electronic device operations of rearranging, based on priorities, the plurality of items and displaying the rearranged the plurality of items, according to an embodiment. For example, FIG. 8B illustrates a case in which the priorities of the plurality of items are changed according to an information change.

Referring to FIG. 8D, when information related to a changed flight departure time is received from the external server, the electronic device may rearrange the plurality of items so that a departure item 860 has the highest priority, and may display the changed information (e.g., a delay) of the flight departure time.

FIG. 8E is a diagram for illustrating electronic device operations of rearranging, based on priorities, the plurality of items and displaying the plurality of rearranged items, according to an embodiment. For example, FIG. 8E illustrates a case in which the priorities of the plurality of items are changed over time.

Referring to FIG. 8E, when a deadline for discounting an admission ticket for a tourist destination arrives, the electronic device may rearrange the plurality of items so that a tourist destination item 870 has the highest priority, and may display discount information (e.g., a period and/or a discount rate). For example, the electronic device may identify that the discount available deadline has arrived, based on booked date change deadline information acquired from a content displayed during a tourist destination search and booked date change deadline information received from the external server.

Figure 8F:
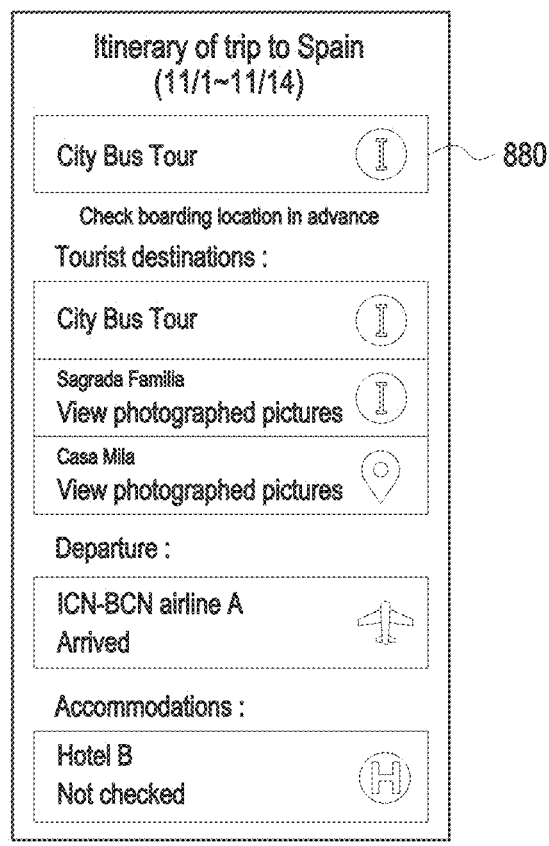
FIG. 8F is a diagram for illustrating electronic device operations of rearranging, based on priorities, the multiple items and displaying the rearranged multiple items, according to an embodiment.

FIG. 8F is a diagram for illustrating electronic device operations of rearranging, based on priorities, the plurality of items and displaying the plurality of rearranged items, according to an embodiment. For example, FIG. 8F illustrates a case in which the priorities of the plurality of items are changed over time.

Referring to FIG. 8F, the electronic device may rearrange the plurality of items so that an item including information to be checked by the user has the highest priority, based on a scheduled itinerary at the current time point (e.g., November 6) during the travel. For example, when the user desires to check a place to take a bus to visit the tourist destination according to the scheduled itinerary, the electronic device may rearrange the plurality of items so that a tourist destination item 880 has the highest priority, and may display that the place to take the bus needs to be checked.

According to an embodiment, the electronic device may change the content of the tourist destination item so as to enable viewing of a record, such as a photo taken in relation to the tourist destination visited according to the scheduled itinerary.

Figure 8G:
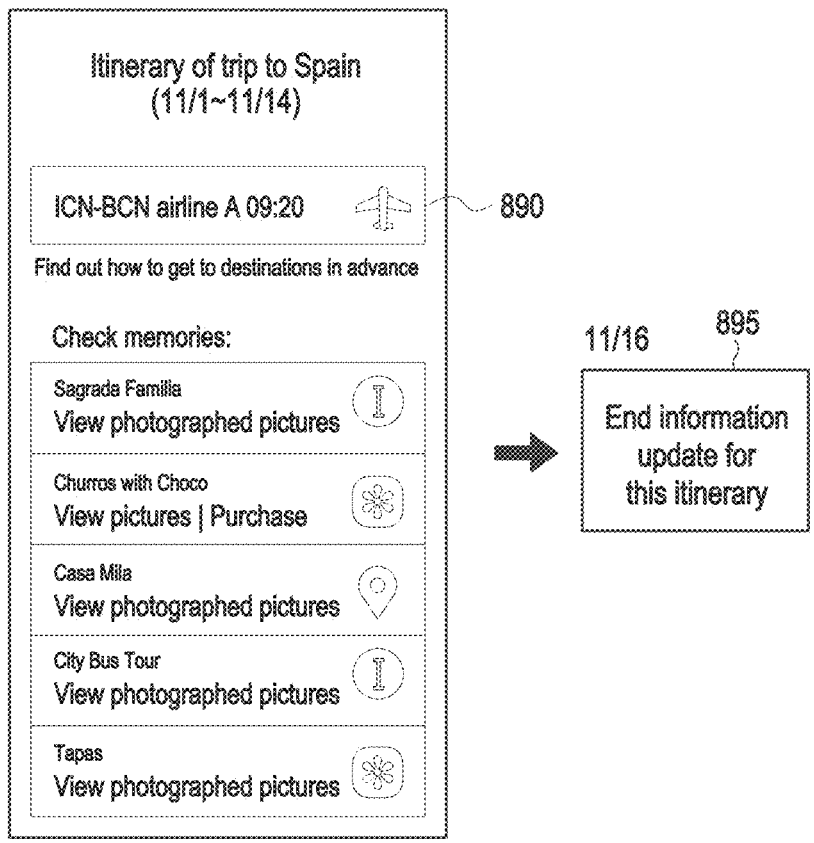
FIG. 8G is a diagram for illustrating electronic device operations of rearranging, based on priorities, the multiple items and displaying the rearranged multiple items, according to an embodiment.

FIG. 8G is a diagram for illustrating electronic device operations of rearranging, based on priorities, the plurality of items and displaying the plurality of multiple items, according to an embodiment. For example, FIG. 8G illustrates a case in which the priorities of the plurality of items are changed over time.

Referring to FIG. 8G, the electronic device may rearrange the plurality of items so that an item, which includes information to be checked by the user one day (e.g., November 13) before the last day (e.g., November 14) of the travel, has the highest priority. For example, if the user desires to check a method to get to an airport, the electronic device may rearrange the plurality of items so that a flight item 890 has the highest priority, and may display that the method to get to the airport needs to be checked.

According to an embodiment, the electronic device may change the content of the tourist destination item so as to enable viewing of a record, such as a photo taken in relation to the tourist destination visited according to the scheduled itinerary.

According to an embodiment, when the itinerary ends (e.g., on November 16), the electronic device may terminate 895 updating of information on the itinerary.

The aforementioned changing of the priorities, illustrated in FIG. 8A to FIG. 8G, is merely an example, and a reason, number of times, and/or sequence of the priority change are not limited thereto.

Figure 9A:
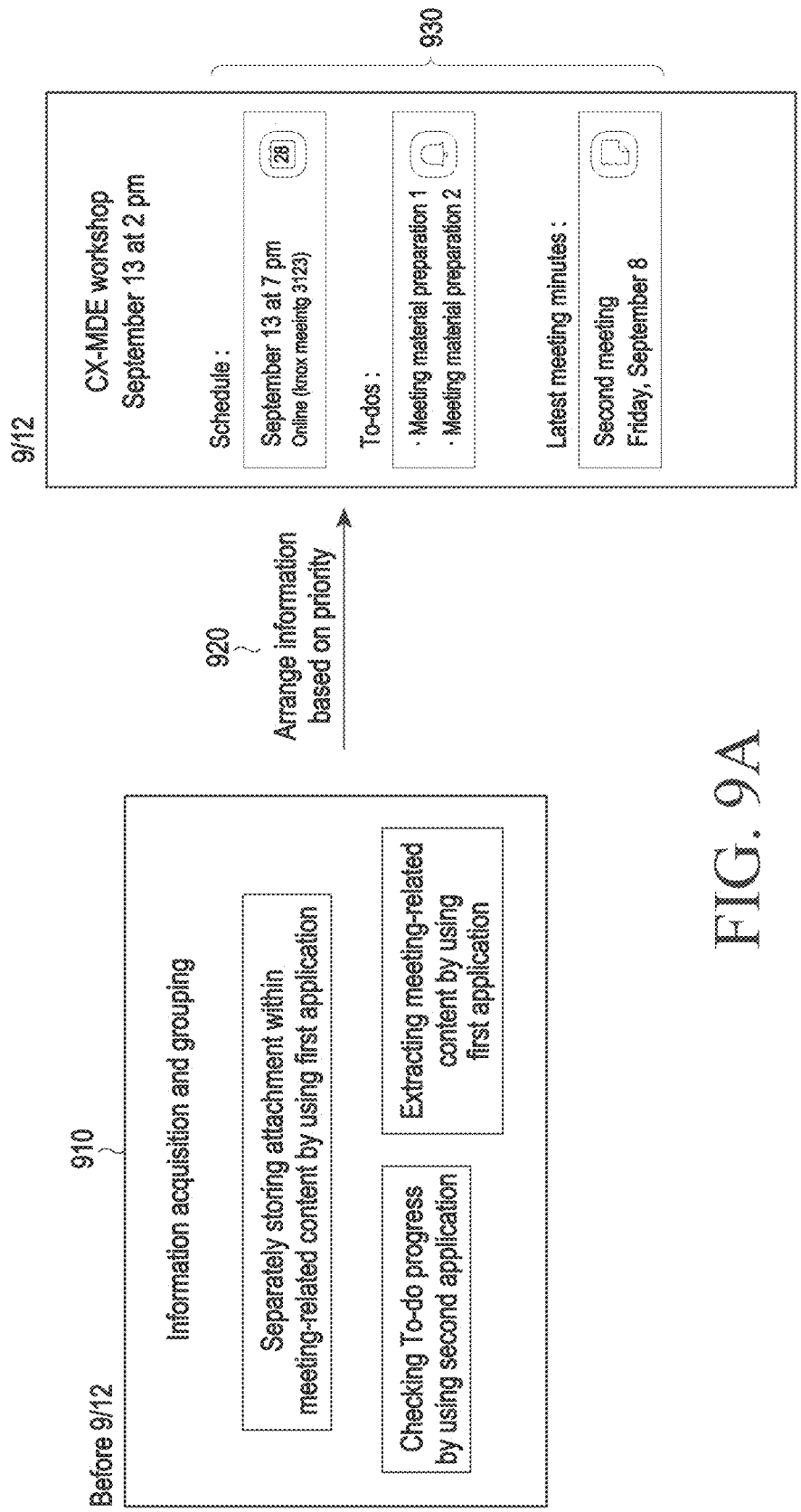
FIG. 9A is a diagram for illustrating electronic device operations of acquiring information, arranging multiple items based on the acquired information according to priorities, and displaying the arranged multiple items, according to an embodiment.

FIG. 9A is a diagram for illustrating electronic device operations of acquiring information, arranging the plurality of items based on the acquired information according to a priority, and displaying the plurality of arranged items, according to an embodiment.

Referring to FIG. 9A, an electronic device (e.g., the electronic device 101 of FIG. 1 or the processor 120 of FIG. 1) may acquire and group 910 information related to a meeting schedule. According to an embodiment, when a content displayed on a display satisfies a configured condition, the electronic device may acquire and group information included in the content. For example, a first application (e.g., an email application and an Internet application) may receive a user input to store an attachment included in a meeting-related content.

According to an embodiment, the electronic device may acquire (e.g., extract) the meeting-related content via an execution screen of the first application. For example, the electronic device may acquire meeting place information, meeting time information, and/or meeting subject information which are included in the body of an email.

According to an embodiment, when a user input to check the progress of a task (to-do) (e.g., preparing meeting materials) in a second application (e.g., a collaboration application) is received, the electronic device may analyze a content (e.g., text or an image) included in an execution screen of a third application so as to check the progress of the task.

According to an embodiment, the electronic device may group the acquired information into one group depending on a purpose. For example, the electronic device may group the acquired information into one schedule. According to an embodiment, the electronic device may perform grouping by further adding, to the information acquired via the content, information received from an external server and information acquired by a user input.

According to an embodiment, the electronic device may classify the grouped information into the plurality of items. For example, the plurality of items may include a schedule (e.g., a meeting date/time) item, a to-do list item, a latest meeting minutes item, and/or an attendee item.

According to an embodiment, the electronic device may arrange 920 information, based on priorities. For example, the electronic device may arrange the plurality of items obtained by classifying the grouped information, based on a configured first priority.

According to an embodiment, in a case of the plurality of meeting-related items, the first priority may be according to importance required for the progress of a meeting. For example, arrangement may be performed so that the schedule item, which is information required to attend a meeting, has the highest priority, and the to-do item and the latest meeting minutes item, which are information required for proceeding with the meeting, have subsequent priorities in sequence.

According to an embodiment, when the electronic device is able to perform grouping into one group (e.g., a schedule or a purchase list) via information acquired for a certain period (e.g., before September 12), the electronic device may classify the acquired information into the plurality of items and arrange the same according to the first priority, and may provide the plurality of arranged items 930 to a user. According to an embodiment, each of the plurality of items 930 may include a link for providing of summary information related to the item and/or detailed information related to the item. For example, the link may include an icon of an application that provides detailed information related to the item.

According to an embodiment, the electronic device may rearrange priorities over time or according to a change of information, which will be described below with reference to FIG. 9B to FIG. 9D.

Figures 9B, 9C:
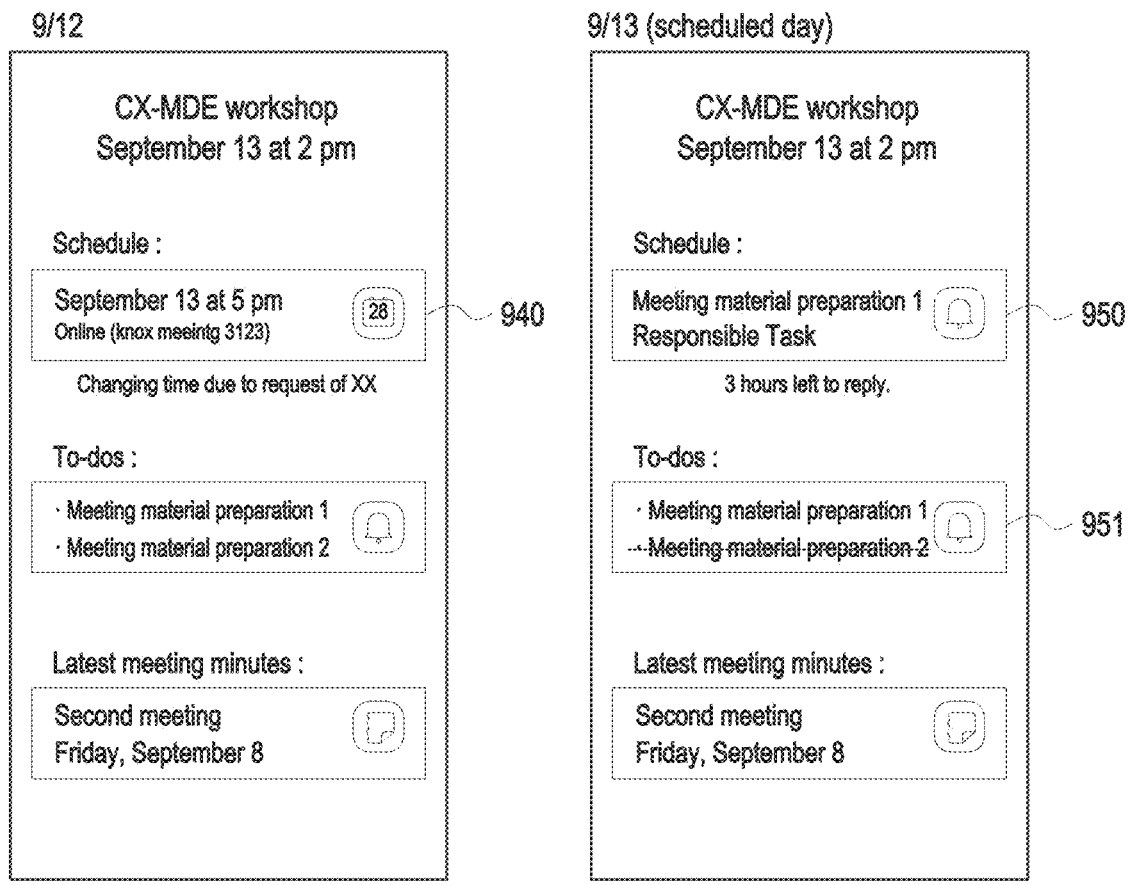
FIG. 9B is a diagram for illustrating electronic device operations of rearranging, based on priorities, the multiple items and displaying the rearranged multiple items, according to an embodiment.
FIG. 9C is a diagram for illustrating electronic device operations of rearranging, based on priorities, the multiple items and displaying the rearranged multiple items, according to an embodiment.

FIG. 9B is a diagram for illustrating electronic device operations of rearranging, based on priorities, the plurality of items and displaying the plurality of rearranged items, according to an embodiment. For example, FIG. 9B illustrates a case in which the priorities of the plurality of items are changed according to an information change.

Referring to FIG. 9B, when information related to a changed meeting time is received from the external server, the electronic device may rearrange the plurality of items so that a schedule item 940 has the highest priority, and may display changed meeting schedule information and/or a reason for the change.

FIG. 9C is a diagram for illustrating electronic device operations of rearranging, based on priorities, the plurality of items and displaying the plurality of rearranged items, according to an embodiment. For example, FIG. 9C illustrates a case in which the priorities of the plurality of items are changed over time.

Referring to FIG. 9C, when a specific time arrives before an execution deadline of an unperformed task among tasks required to be performed in the to-do list included in a to-do item 951, the electronic device may rearrange the plurality of items so that a to-do item 950 has the highest priority, and may display the remaining deadline.

According to an embodiment, in the to-do item 951 including the to-do list, the electronic device may display a performed task as being deleted from the list, so as to indicate that the task has been completed.

Figure 9D:
FIG. 9D is a diagram for illustrating electronic device operations of rearranging, based on priorities, the multiple items and displaying the rearranged multiple items, according to an embodiment.

FIG. 9D is a diagram for illustrating electronic device operations of rearranging, based on priorities, the plurality of items and displaying the plurality of rearranged items, according to an embodiment. For example, FIG. 9D illustrates a case in which the priorities of the plurality of items are changed according to an information change.

Referring to FIG. 9D, when a new material (e.g., e-mail) related to the meeting is acquired from the external server, the electronic device may rearrange the plurality of items so that a material item 960 has the highest priority, and may display a title of the newly acquired material and/or a sender of the material.

Figure 10A:
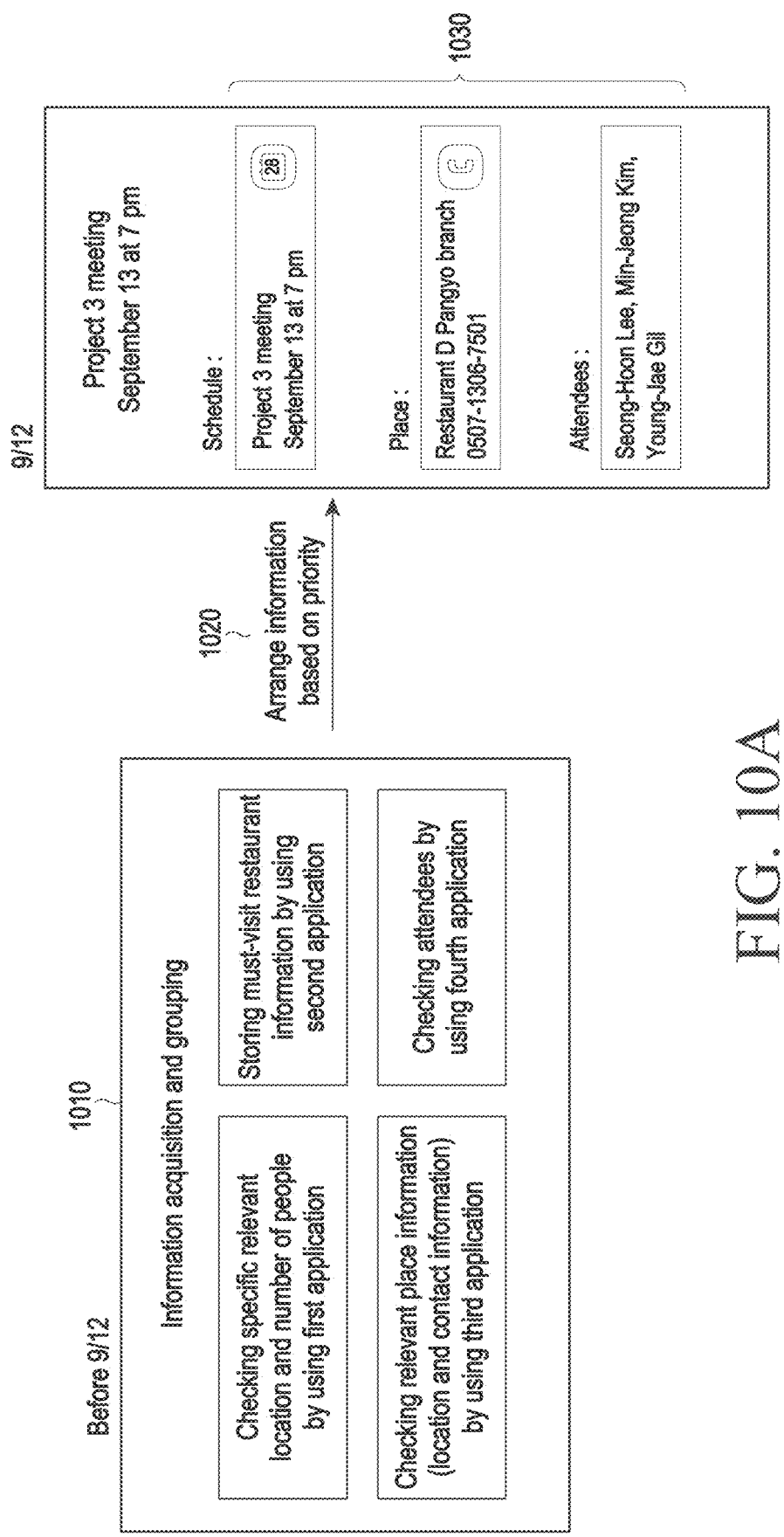
FIG. 10A is a diagram for illustrating electronic device operations of acquiring information, arranging multiple items based on the acquired information according to priorities, and displaying the arranged multiple items, according to an embodiment.

FIG. 10A is a diagram for illustrating electronic device operations of acquiring information, arranging the plurality of items based on the acquired information according to a priority, and displaying the plurality of arranged items, according to an embodiment.

Referring to FIG. 10A, an electronic device (e.g., the electronic device 101 of FIG. 1 or the processor 120 of FIG. 1) may acquire and group 1010 information related to a meeting schedule. According to an embodiment, when a content displayed on a display satisfies a configured condition, the electronic device may acquire and group information included in the content. For example, a first application (e.g., an Internet application, a booking agency application, and a restaurant's own application) may receive a user input of inputting the number of people and a specific place related to a meeting.

According to an embodiment, the electronic device may acquire (e.g., extract) a meeting-related content via a content (e.g., text or an image) included in an execution screen of the first application. For example, the electronic device may acquire a meeting place, meeting time information, and/or information on meeting attendees via a restaurant booking screen of the first application.

According to an embodiment, the electronic device may acquire restaurant-related information via an execution screen of a second application (e.g., the Internet application and an SNS application). For example, the electronic device may analyze a content (e.g., text or an image) included in the execution screen of the second application so as to acquire restaurant-related information, such as a main menu item and/or discount information of a restaurant.

According to an embodiment, the electronic device may acquire place-related information, such as a restaurant location and/or contact information, via a content (e.g., text or an image) included in an execution screen of a third application (e.g., the Internet application and a map application).

According to an embodiment, the electronic device may acquire the number of attendees and/or attendee name information via a content (e.g., text or an image) included in an execution screen of a fourth application (e.g., an email application and a message application).

According to an embodiment, the electronic device may group the acquired information into one group depending on a purpose. For example, the electronic device may group the acquired information into one schedule. According to an embodiment, the electronic device may perform grouping by further adding, to the information acquired via the content, information received from an external server and information acquired by a user input.

According to an embodiment, the electronic device may classify the grouped information into the plurality of items. For example, the plurality of items may include a schedule (e.g., a meeting date/time) item, a place item, an attendee item, a parking lot information item, a recommended menu item, and/or a discount information item.

According to an embodiment, the electronic device may arrange 1020 information, based on priorities. For example, the electronic device may arrange the plurality of items obtained by classifying the grouped information, based on a configured first priority.

According to an embodiment, in a case of the plurality of meeting-related items, the first priority may be according to importance required for the progress of a meeting. For example, arrangement may be performed so that the schedule item, which is information required to attend a meeting, has the highest priority, and the meeting place item and the attendee item have subsequent priorities in sequence.

According to an embodiment, when the electronic device is able to perform grouping into one group (e.g., a schedule or a purchase list) via information acquired for a certain period (e.g., before September 12), the electronic device may classify the acquired information into the plurality of items and arrange the same according to the first priority, and may provide the plurality of arranged items 1030 to a user. According to an embodiment, each of the plurality of items 1030 may include a link for providing of summary information related to the item and/or detailed information related to the item. For example, the link may include an icon of an application that provides detailed information related to the item.

According to an embodiment, the electronic device may rearrange priorities over time or according to a change of information, which will be described below with reference to FIG. 10B to FIG. 10D.

Figure 10B:
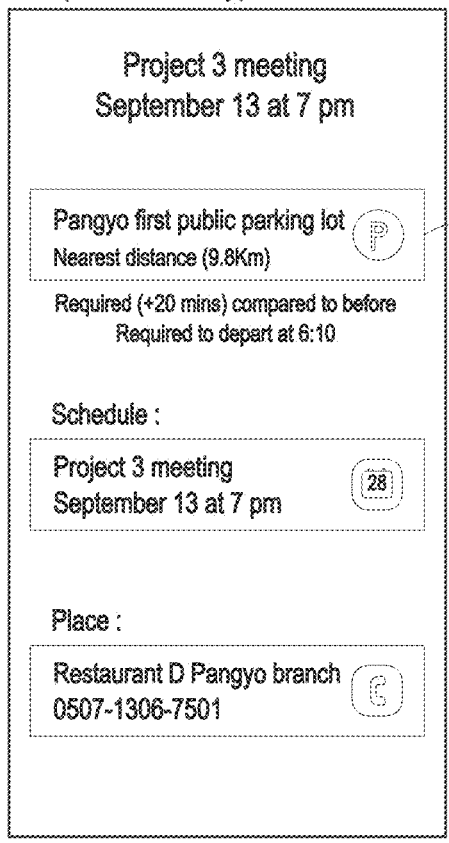
FIG. 10B is a diagram for illustrating electronic device operations of rearranging, based on priorities, the multiple items and displaying the rearranged multiple items, according to an embodiment.

FIG. 10B is a diagram for illustrating electronic device operations of rearranging, based on priorities, the plurality of items and displaying the plurality of rearranged items, according to an embodiment. For example, FIG. 10B illustrates a case in which the priorities of the plurality of items are changed over time.

Referring to FIG. 10B, if a specific time point arrives before starting a schedule on a scheduled day, the electronic device may rearrange the plurality of items so that a parking lot information item 1040 has the highest priority, and may display a time required to arrive at the meeting place and a time to depart.

According to an embodiment, the electronic device may rearrange the plurality of items so that the schedule item previously having the highest priority and a place item 1041 having a subsequent priority have priorities lowered by one level.

Figure 10C:
FIG. 10C is a diagram for illustrating electronic device operations of rearranging, based on priorities, the multiple items and displaying the rearranged multiple items, according to an embodiment.

FIG. 10C is a diagram for illustrating electronic device operations of rearranging, based on priorities, the plurality of items and displaying the plurality of rearranged items, according to an embodiment. For example, FIG. 10C illustrates a case in which the priorities of the plurality of items are changed over time.

Referring to FIG. 10C, after checking departure and before arrival, the electronic device may rearrange the plurality of items so that a recommended menu item 1050 has the highest priority, and may display a recommended menu.

Figure 10D:
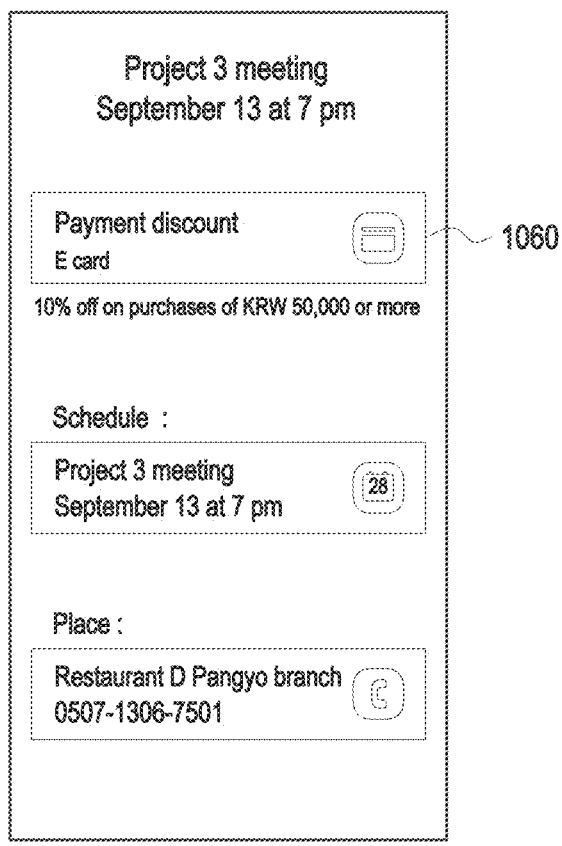
FIG. 10D is a diagram for illustrating electronic device operations of rearranging, based on priorities, the multiple items and displaying the rearranged multiple items, according to an embodiment.

FIG. 10D is a diagram for illustrating electronic device operations of rearranging, based on priorities, the plurality of items and displaying the plurality of rearranged items, according to an embodiment. For example, FIG. 10D illustrates a case in which the priorities of the plurality of items are changed over time.

Referring to FIG. 10D, the electronic device may rearrange the plurality of items so that a discount information item 1060 has the highest priority during the progress of the schedule, and may display information related to a discount card, a discount condition, and/or a discount rate.

Figure 11A:
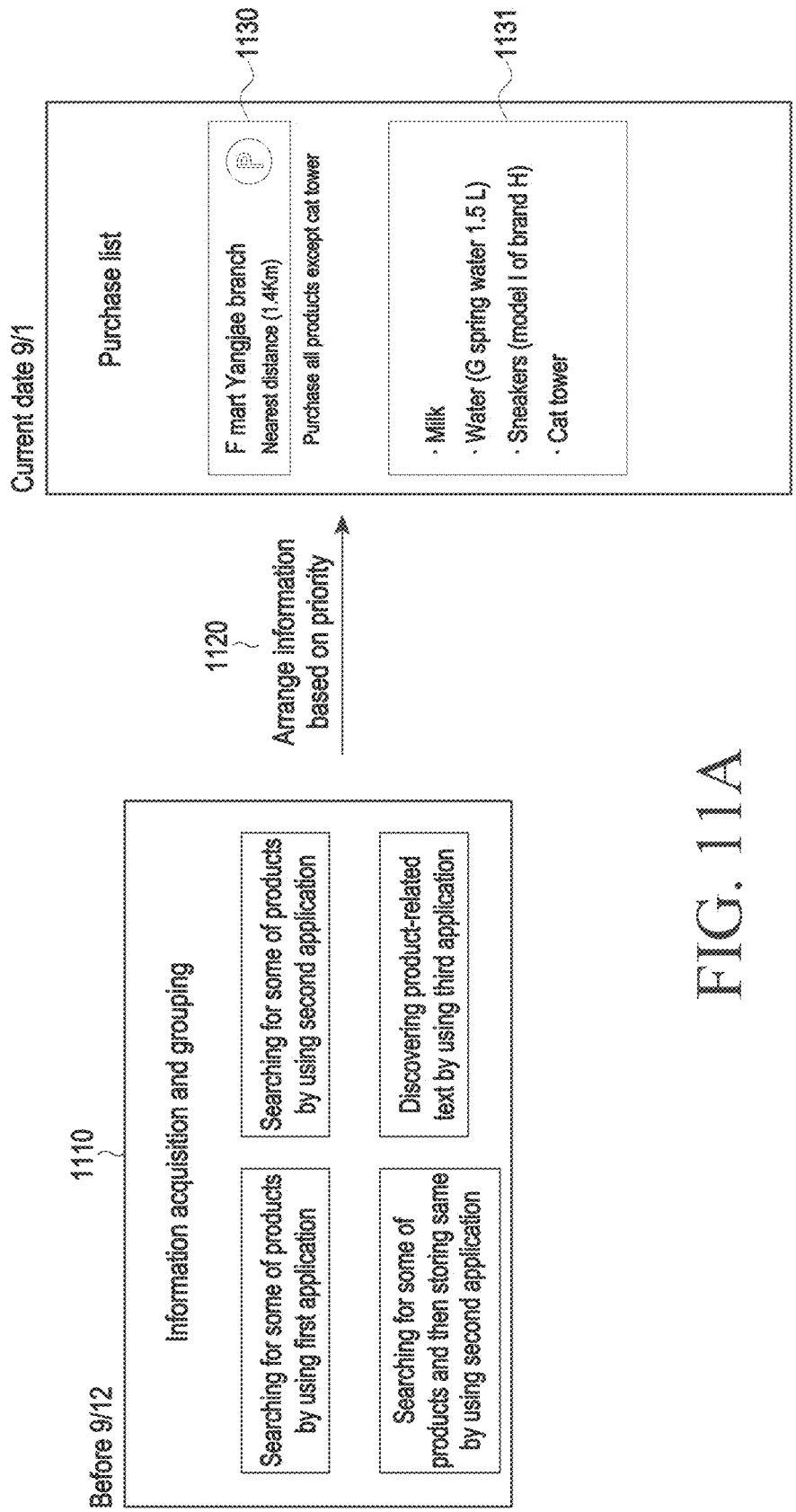
FIG. 11A is a diagram for illustrating electronic device operations of acquiring information, arranging multiple items based on the acquired information according to priorities, and displaying the arranged multiple items, according to an embodiment.

FIG. 11A is a diagram for illustrating electronic device operations of acquiring information, arranging the plurality of items based on the acquired information according to priorities, and displaying the plurality of arranged items, according to an embodiment.

Referring to FIG. 11A, an electronic device (e.g., the electronic device 101 of FIG. 1 or the processor 120 of FIG. 1) may acquire and group 1110 information related to a meeting schedule. According to an embodiment, when a content displayed on a display satisfies a configured condition, the electronic device may acquire and group information included in the content. For example, a first application (e.g., a shopping mall application, an Internet application, and an SNS application) may receive a user input to retrieve some of products.

According to an embodiment, the electronic device may acquire retrieved product-related information via a content (e.g., text or an image) included in an execution screen of the first application. For example, the electronic device may acquire a product name, option information, and/or information on a product price via a product description screen of the first application.

According to an embodiment, the electronic device may receive a user input to retrieve some of products via an execution screen of a second application (e.g., the shopping mall application, the Internet application, and the SNS application), and may acquire product-related information by analyzing a content (e.g., text or an image) included in the execution screen of the second application.

According to an embodiment, when a user input to capture the content (e.g., text or an image) included in the execution screen of the second application is received, the electronic device may acquire information included in a captured image, as the product-related information.

According to an embodiment, the electronic device may acquire the product-related information via text included in an execution screen of a third application (e.g., the email application, the message application, and a document writing application).

According to an embodiment, the electronic device may group the acquired information into one group depending on a purpose. For example, the electronic device may group the acquired information into one schedule. According to an embodiment, the electronic device may perform grouping by further adding, to the information acquired via the content, information received from an external server and information acquired by a user input.

According to an embodiment, the electronic device may classify the grouped information into the plurality of items. For example, the plurality of items may include a purchase goods list item and/or a purchase place item. According to an embodiment, information on the purchase place item may be information on a place where multiple goods included in a purchase goods list can be purchased the most, and may include a location of an offline store or an online site address.

According to an embodiment, the electronic device may arrange 1120 information, based on priorities. For example, the electronic device may arrange the plurality of items obtained by classifying the grouped information, based on a configured first priority.

According to an embodiment, in a case of the plurality of purchase list-related items 1130 and 1131, the first priority may be according to importance required for purchasing a product. For example, arrangement may be performed so that the place item 1130, which is information for purchasing a product, has the highest priority, and the purchase goods list item 1131 has a priority in sequence.

According to an embodiment, the electronic device may arrange, based on the priorities, multiple products included in the purchase goods list item 1131. For example, the electronic device may arrange the multiple products, based on a sequence in which the products are retrieved, or based on whether or not the products are daily use items.

According to an embodiment, when the electronic device is able to perform grouping into one group (e.g., a schedule or a purchase list) via information acquired for a certain period (e.g., before September 1), the electronic device may classify the acquired information into the plurality of items and arrange the same according to the first priority, and may provide the plurality of arranged items 1130 and 1131 to a user. According to an embodiment, at least a part of the plurality of items 1130 and 1131 may include links for providing item-related summary information and/or item-related detailed information. For example, the link may include an icon of an application that provides the item-related detailed information.

According to an embodiment, the electronic device may rearrange the priorities over time or according to a change of information, which will be described below with reference to FIG. 11B and FIG. 11C.

Figure 11B:
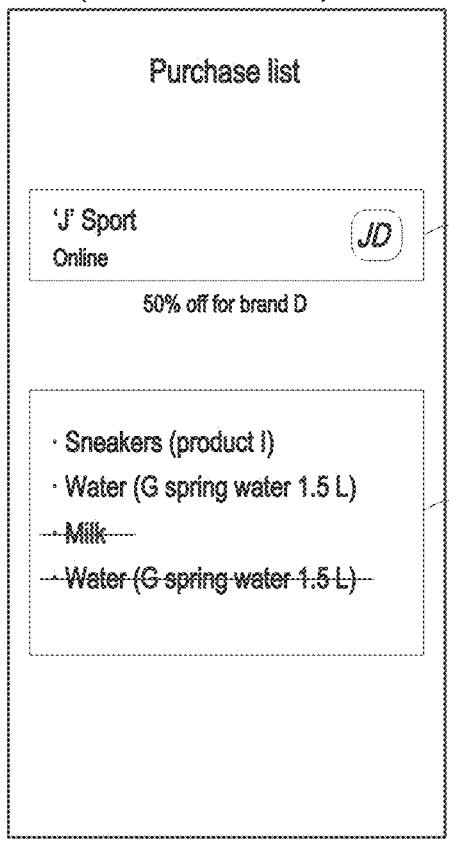
FIG. 11B is a diagram for illustrating electronic device operations of rearranging, based on priorities, the multiple items and displaying the rearranged multiple items, according to an embodiment.

FIG. 11B is a diagram for illustrating electronic device operations of rearranging, based on priorities, the plurality of items and displaying the plurality of rearranged items, according to an embodiment. For example, FIG. 11B illustrates a case in which the priorities of the plurality of items are changed over time and according to an information change.

Referring to FIG. 11B, the electronic device may display purchased goods (e.g., milk and water) as being deleted from a purchase goods list 1141 so as to indicate that the purchase has been completed, and may rearrange the priority thereof to have a lower priority.

According to an embodiment, when a discount period related to goods (e.g., sneakers) required to be purchased arrives with the passage of time, the electronic device may change information of the place item 1140 to information on a place where the discount is performed. According to an embodiment, the electronic device may change the information of the place item 1140 to information on the place where the discount is performed, and may display a discount rate and/or discount period information.

Figure 11C:
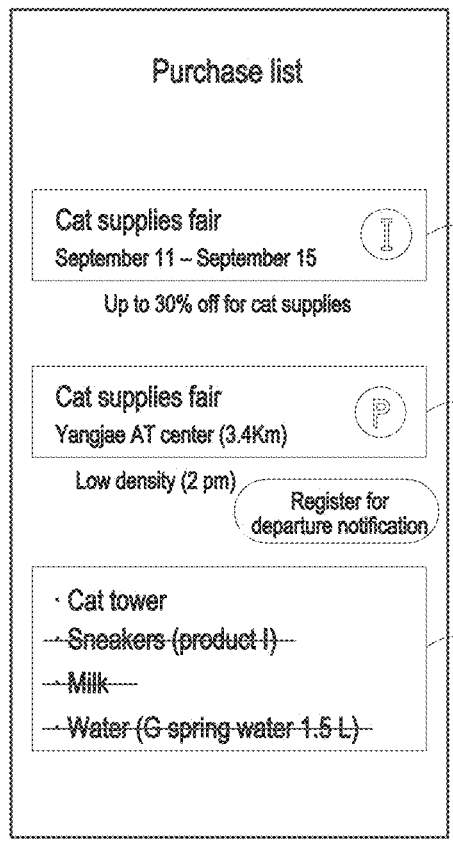
FIG. 11C is a diagram for illustrating electronic device operations of rearranging, based on priorities, the multiple items and displaying the rearranged multiple items, according to an embodiment.

FIG. 11C is a diagram for illustrating electronic device operations of rearranging, based on priorities, the plurality of items and displaying the plurality of rearranged items, according to an embodiment. For example, FIG. 11C illustrates a case in which the priorities of the plurality of items are changed over time and according to an information change.

Referring to FIG. 11C, the electronic device may display purchased goods (e.g., milk, water, and sneakers) as being deleted from a purchase goods list 1152 so as to indicate that the purchase has been completed, and may rearrange the priority thereof to have a lower priority.

According to an embodiment, when a discount period related to goods required to be purchased (e.g., a cat tower) arrives with the passage of time, the electronic device may rearrange the plurality of items so that a discount period item 1150 and a discount place item 1151 have the highest priority. According to an embodiment, when a deadline (September 14) of the purchase list is near, the electronic device may change information of the discount place item 1151 to an offline place in order to recommend offline purchase rather than online purchase. According to an embodiment, in addition to rearrangement of the plurality of items, the electronic device may display discount rate information and optimal purchase time period information.

According to an embodiment, an electronic device may include a display, a memory, and at least one processor, wherein the at least one processor is configured to execute instructions to, if a content displayed on the display satisfies a configured condition, acquire information included in the content, arrange, based on a first priority, the plurality of items acquired based on the information included in the content so as to store the same in the memory, rearrange the plurality of items based on a second priority if a current time point satisfies the configured condition, and control the display to display the plurality of rearranged items.

According to an embodiment, if the content includes at least one of time information, place information, or an event name, the at least one processor may execute the instructions to determine that the configured condition is satisfied, and may acquire the information included in the content.

According to an embodiment, if a content satisfying the configured condition is displayed, the at least one processor may execute the instructions to display a user interface to store information related to the content in a partial area of the display, and may acquire the information included in the content when a user input to select the user interface is received.

According to an embodiment, the at least one processor may execute the instructions to acquire, if a first content included in an execution screen of a first application displayed on the display satisfies the configured condition, information included in the first content, may acquire, if a second content included in an execution screen of a second application displayed on the display satisfies the configured condition, information included in the second content, and may acquire the plurality of items based on the information included in the first content and the information included in the second content.

According to an embodiment, the electronic device may further include a communication module, and the at least one processor may execute the instructions to acquire the plurality of items by further including information received from an external server via the communication module.

According to an embodiment, the at least one processor may execute the instructions to receive a user input to input information via the display, and may acquire the plurality of items by further including information input via the user input.

According to an embodiment, the at least one processor may execute the instructions to group the information included in the content into one schedule via analysis of at least one of an image or text included in the content, may classify the grouped information included in the content into the plurality of items, may rearrange the plurality of items based on the second priority if the current time point is before a first period of a time point related to the one schedule, and may rearrange the plurality of items based on a third priority if the current time point is before a second period that is shorter than the first period of the time point related to the one schedule.

According to an embodiment, the at least one processor may execute the instructions to control, when the plurality of items are rearranged, the display to display a notification of the rearrangement, and may control the display to display the plurality of rearranged items when a user input to select the notification is received.

According to an embodiment, when an event occurs in which information included in at least one of the plurality of items is changed, the at least one processor may execute the instructions to rearrange the plurality of items so that the item in which information has been changed has the highest priority.

According to an embodiment, the electronic device may further include a communication module, and the at least one processor may execute the instructions to identify that the event has occurred when the changed information for at least one of the plurality of items is received from an external server via the communication module.

According to an embodiment, a control method of an electronic device may include, if a content displayed on a display of the electronic device satisfies a configured condition, acquiring information included in the content, arranging, based on a first priority, the plurality of items acquired based on the information included in the content so as to store the same in a memory of the electronic device, rearranging the plurality of items, based on a second priority if a current time point satisfies the configured condition, and controlling the display to display the plurality of rearranged items.

According to an embodiment, the acquiring of the information included in the content may include, if the content includes at least one of time information, place information, or an event name, determining that the configured condition is satisfied, and acquiring the information included in the content.

According to an embodiment, the acquiring of the information included in the content may include, if a content satisfying the configured condition is displayed, displaying a user interface to store information related to the content in a partial area of the display, and acquiring the information included in the content when a user input to select the user interface is received.

According to an embodiment, the acquiring of the information included in the content may include acquiring, if a first content included in an execution screen of a first application displayed on the display satisfies the configured condition, information included in the first content, and acquiring, if a second content included in an execution screen of a second application displayed on the display satisfies the configured condition, information included in the second content, and the arranging of the plurality of items based on the first priority and storing the same in a memory of the electronic device may include acquiring the plurality of items, based on the information included in the first content and the information included in the second content.

According to an embodiment, the arranging of the plurality of items based on the first priority and storing the same in a memory of the electronic device may include acquiring the plurality of items by further including information received from an external server.

According to an embodiment, the arranging of the plurality of items based on the first priority and storing the same in a memory of the electronic device may include receiving a user input to input information via the display, and acquiring the plurality of items by further including information input via the user input.

According to an embodiment, the arranging of the plurality of items based on the first priority and storing the same in a memory of the electronic device may include grouping the information included in the content into one schedule via analysis of at least one of an image or text included in the content, and classifying the grouped information included in the content into the plurality of items, and the rearranging of the plurality of items based on the second priority may include, if the current time point is before a first period of a time point related to the one schedule, rearranging the plurality of items based on the second priority, and if the current time point is before a second period that is shorter than the first period of the time point related to the one schedule, rearranging the plurality of items based on a third priority.

According to an embodiment, the method may further include, when the plurality of items are rearranged, controlling the display to display a notification of the rearrangement, and when a user input to select the notification is received, controlling the display to display the plurality of rearranged items.

According to an embodiment, the method may further include, when an event occurs in which information included in at least one of the plurality of items is changed, rearranging the plurality of items so that the item in which information has been changed has the highest priority.

According to an embodiment, the method may further include, when the changed information for at least one of the plurality of items is received from an external server, identifying that the event has occurred.

According to an embodiment, a non-transitory storage medium storing instructions configured to be executed by at least one processor of an electronic device to enable the electronic device to perform: based on a content displayed on a display of the electronic device satisfying a configured condition, acquiring information included in the content, arranging and storing in a memory of the electronic device, based on a first priority, a plurality of items acquired based on the information included in the content, based on a current time point satisfying the configured condition, rearranging the plurality of items based on a second priority, and controlling the display to display the plurality of rearranged items.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a display;
   at least one processor including processing circuitry; and
   memory storing instructions that, when executed by the at least one processor individually or collectively, cause the electronic device to:
   based on a content displayed on the display satisfying a configured condition, extract information included in the content by analyzing the content,
   group the information included in the content into one schedule via analysis of at least one of an image or text included in the content,
   acquire a plurality of items by classifying the grouped information into the plurality of items,
   arrange and store in the memory, based on a first priority, the plurality of items,
   in response to a current time point being before a first time period related to the one schedule, rearrange the plurality of items based on a second priority,
   in response to the current time point being before a second time period that is shorter than the first time period related to the one schedule, rearrange the plurality of items based on a third priority, and
   control the display to display the plurality of rearranged items.

2. The electronic device of claim 1, wherein the instructions, when executed by the at least one processor individually or collectively, cause the electronic device to:
   based on the content comprising at least one of time information, place information, or an event name, determine that the configured condition is satisfied, and extract the information included in the content.

3. The electronic device of claim 1, wherein the instructions, when executed by the at least one processor individually or collectively, cause the electronic device to:
   based on a content satisfying the configured condition being displayed, display a user interface to store information related to the content in a partial area of the display, and
   based on a user input to select the user interface being received, extract the information included in the content.

4. The electronic device of claim 1, wherein the instructions, when executed by the at least one processor individually or collectively, cause the electronic device to:
   based on a first content included in an execution screen of a first application displayed on the display satisfying the configured condition, extract information included in the first content,
   based on a second content included in an execution screen of a second application displayed on the display satisfying the configured condition, extract information included in the second content, and acquire the plurality of items based on the information included in the first content and the information included in the second content.

5. The electronic device of claim 1, further comprising a communication module,
wherein the plurality of items further comprise at least one item related to information received from an external server via the communication module.

6. The electronic device of claim 1, wherein the instructions, when executed by the at least one processor individually or collectively, cause the electronic device to:
receive a user input to input information via the display, and
wherein the plurality of items further comprise at least one item related to information input via the user input.

7. The electronic device of claim 1, wherein the instructions, when executed by the at least one processor individually or collectively, cause the electronic device to:
based on the plurality of items being rearranged, control the display to display a notification of the rearrangement, and
based on a user input to select the notification being received, control the display to display the plurality of rearranged items.

8. The electronic device of claim 1, wherein the instructions, when executed by the at least one processor individually or collectively, cause the electronic device to:
based on an event occurring in which information included in at least one of the plurality of items is changed, rearrange the plurality of items so that the at least one item in which information included in the at least one item is changed has the highest priority.

9. The electronic device of claim 8, further comprising a communication module, wherein the instructions, when executed by the at least one processor individually or collectively, cause the electronic device to:
based on the changed information for at least one of the plurality of items being received from an external server via the communication module, identify that the event has occurred.

10. A control method of an electronic device, the method comprising:
based on a content displayed on a display of the electronic device satisfying a configured condition, extracting information included in the content by analyzing the content;
grouping the information included in the content into one schedule via analysis of at least one of an image or text included in the content;
acquiring a plurality of items by classifying the grouped information into the plurality of items;
arranging and storing in a memory of the electronic device, based on a first priority, the plurality of items;
in response to a current time point being before a first time period related to the one schedule, rearranging the plurality of items based on a second priority;
in response to the current time point being before a second time period that is shorter than the first time period related to the one schedule, rearranging the plurality of items based on a third priority; and
controlling the display to display the plurality of rearranged items.

11. The method of claim 10, wherein the extracting of the information included in the content comprises, based on the content comprising at least one of time information, place information, or an event name, determining that the configured condition is satisfied, and
acquiring the information included in the content.

12. The method of claim 10, wherein the extracting of the information included in the content comprises, based on a content satisfying the configured condition being displayed, displaying a user interface to store information related to the content in a partial area of the display, and
based on a user input to select the user interface being received, extracting the information included in the content.

13. The method of claim 10, wherein the extracting of the information included in the content comprises, based on a first content included in an execution screen of a first application displayed on the display satisfying the configured condition, extracting information included in the first content, and
based on a second content included in an execution screen of a second application displayed on the display satisfying the configured condition, extracting information included in the second content, and
wherein the arranging of the plurality of items based on the first priority and storing the same in a memory of the electronic device comprises acquiring the plurality of items based on the information included in the first content and the information included in the second content.

14. The method of claim 10, wherein the plurality of items further comprise at least one item related to information received from an external server.

15. The method of claim 10, wherein the arranging and the storing in the memory of the electronic device, the plurality of items based on the first priority comprise receiving a user input to input information via the display, and
wherein the plurality of items further comprise at least one item related to information input via the user input.

16. The method of claim 10, further comprising:
based on the plurality of items being rearranged, controlling the display to display a notification the rearrangement; and
based on a user input to select the notification being received, controlling the display to display the plurality of rearranged items.

17. The method of claim 10, further comprising, based on an event occurring in which information included in at least one of the plurality of items is changed, rearranging the plurality of items so that the at least one item in which information in the at least one item is changed has the highest priority, and based on the changed information for at least one of the plurality of items being received from an external server, identifying that the event has occurred.

18. A non-transitory storage medium storing instructions that, when executed by at least one processor of an electronic device individually or collectively, cause the electronic device to perform a plurality of operations, the plurality of operations comprising:
based on a content displayed on a display of the electronic device satisfying a configured condition, extracting information included in the content by analyzing the content;
grouping the information included in the content into one schedule via analysis of at least one of an image or text included in the content;
acquiring a plurality of items by classifying the grouped information into the plurality of items;
arranging and storing in a memory of the electronic device, based on a first priority, the plurality of items;

in response to a current time point being before a first time period related to the one schedule, rearranging the plurality of items based on a second priority;

in response to the current time point being before a second time period that is shorter than the first time period related to the one schedule, rearranging the plurality of items based on a third priority; and controlling the display to display the plurality of rearranged items.

* * * * *